US011347368B2

(12) United States Patent
O'Hare et al.

(10) Patent No.: US 11,347,368 B2
(45) Date of Patent: May 31, 2022

(54) AUTOMATED INSPECTION PROCESS FOR BATCH PRODUCTION

(71) Applicant: Hexagon Metrology, Inc., North Kingstown, RI (US)

(72) Inventors: Jonathan J. O'Hare, East Greenwich, RI (US); Jonathan Dove, Woodstock, IL (US); Joseph VanPelt, Charlotte, NC (US)

(73) Assignee: Hexagon Metrology, Inc., North Kingstown, RI (US)

(*) Notice: Subject to any disclaimer, the term of this patent is extended or adjusted under 35 U.S.C. 154(b) by 103 days.

(21) Appl. No.: 16/869,239

(22) Filed: May 7, 2020

(65) Prior Publication Data

US 2020/0356218 A1   Nov. 12, 2020

Related U.S. Application Data

(60) Provisional application No. 62/844,160, filed on May 7, 2019, provisional application No. 62/844,162, filed on May 7, 2019.

(51) Int. Cl.
| | | |
|---|---|---|
| *G01B 5/008* | (2006.01) | |
| *G06F 3/0481* | (2022.01) | |
| *G05B 19/406* | (2006.01) | |
| *G05B 19/4155* | (2006.01) | |
| *G06F 3/04817* | (2022.01) | |
| *G06F 3/0482* | (2013.01) | |
| *G05B 19/418* | (2006.01) | |
| *G01B 21/04* | (2006.01) | |
| *G01B 5/012* | (2006.01) | |

(52) U.S. Cl.
CPC ......... *G06F 3/0481* (2013.01); *G01B 21/047* (2013.01); *G05B 19/406* (2013.01); *G05B 19/4155* (2013.01); *G05B 19/4187* (2013.01); *G06F 3/0482* (2013.01); *G06F 3/04817* (2013.01); *G01B 5/012* (2013.01); *G05B 2219/32077* (2013.01); *G05B 2219/32368* (2013.01); *G05B 2219/50391* (2013.01)

(58) Field of Classification Search
CPC .......................... G01B 21/047; G05B 19/4187
USPC ................................................ 33/1 BB, 503
See application file for complete search history.

(56) References Cited

U.S. PATENT DOCUMENTS

| | | | | |
|---|---|---|---|---|
| 8,600,523 | B2* | 12/2013 | Ruck | G05B 19/0426 700/12 |
| 10,914,581 | B2* | 2/2021 | Atherton | G01B 5/0014 |
| 11,175,131 | B2* | 11/2021 | Hemmings | G01R 1/073 |
| 2012/0317826 | A1 | 12/2012 | Jonas | |
| 2015/0051862 | A1 | 2/2015 | Jonas | |

(Continued)

OTHER PUBLICATIONS

International Search Report and Written Opinion for International Application No. PCT/US2020/031900, dated Sep. 30, 2020 (17 pages).

*Primary Examiner* — George B Bennett
(74) *Attorney, Agent, or Firm* — Nutter McClennen & Fish LLP

(57) ABSTRACT

Various embodiments enable batch inspection of a plurality of workpieces by and inspection instrument such as a coordinate measuring machine. Some embodiments present user interfaces, including graphical user interfaces, to enable an operator to configure a batch inspection system and a batch inspection job, and to monitor and control execution of a batch inspection job.

20 Claims, 23 Drawing Sheets

(56) References Cited

U.S. PATENT DOCUMENTS

2019/0101889 A1    4/2019  Riek et al.
2020/0356218 A1*  11/2020  O'Hare ................ G05B 19/406
2021/0387301 A1*  12/2021  O'Hare ................ B23Q 7/046

* cited by examiner

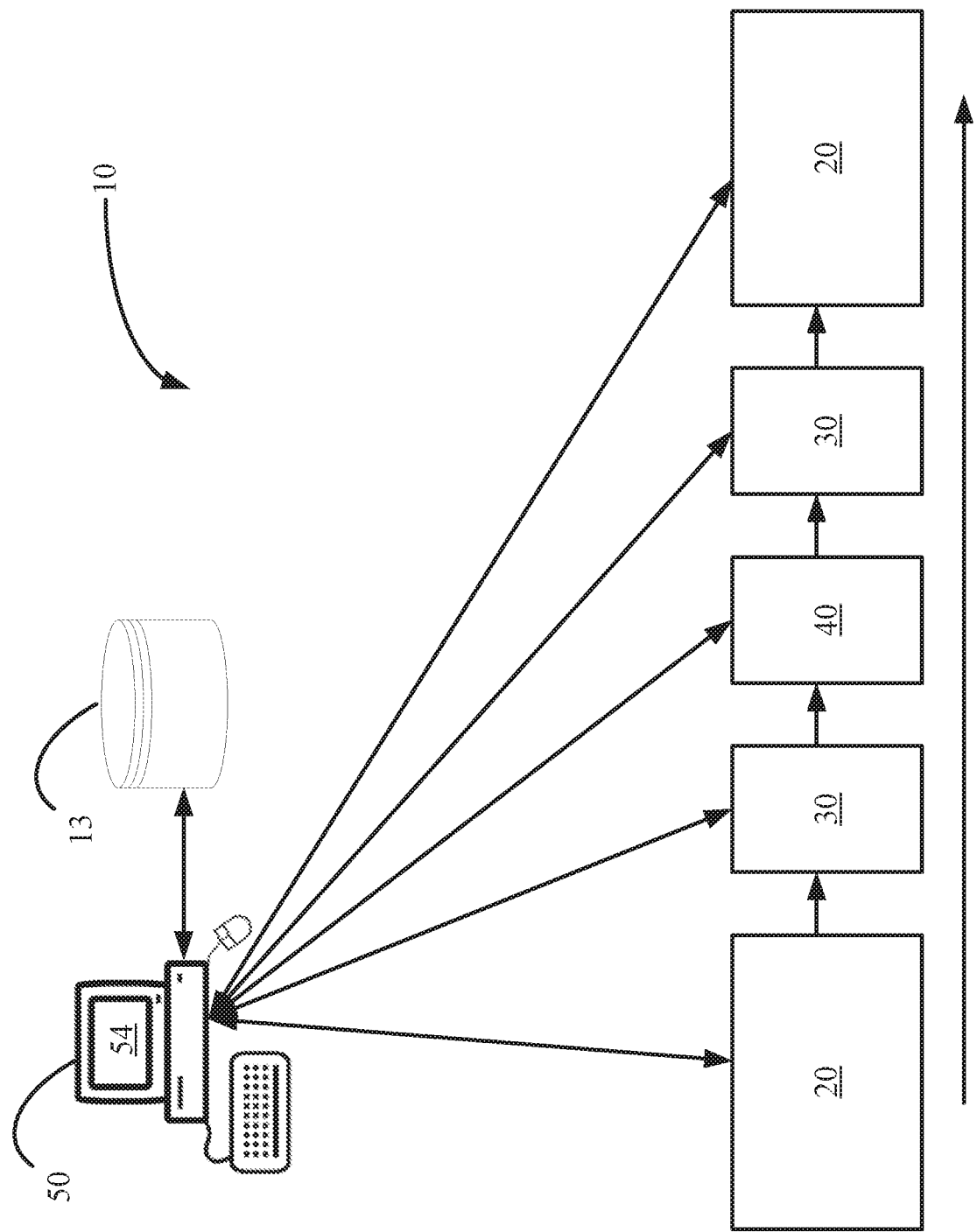

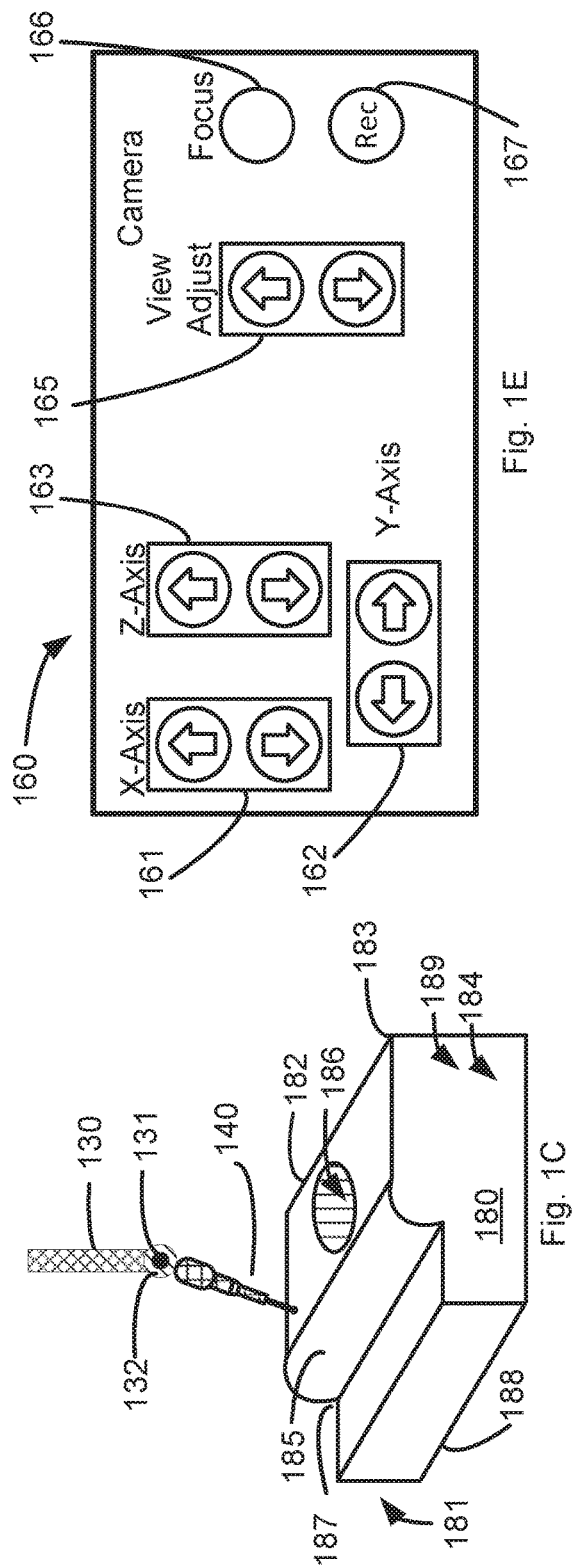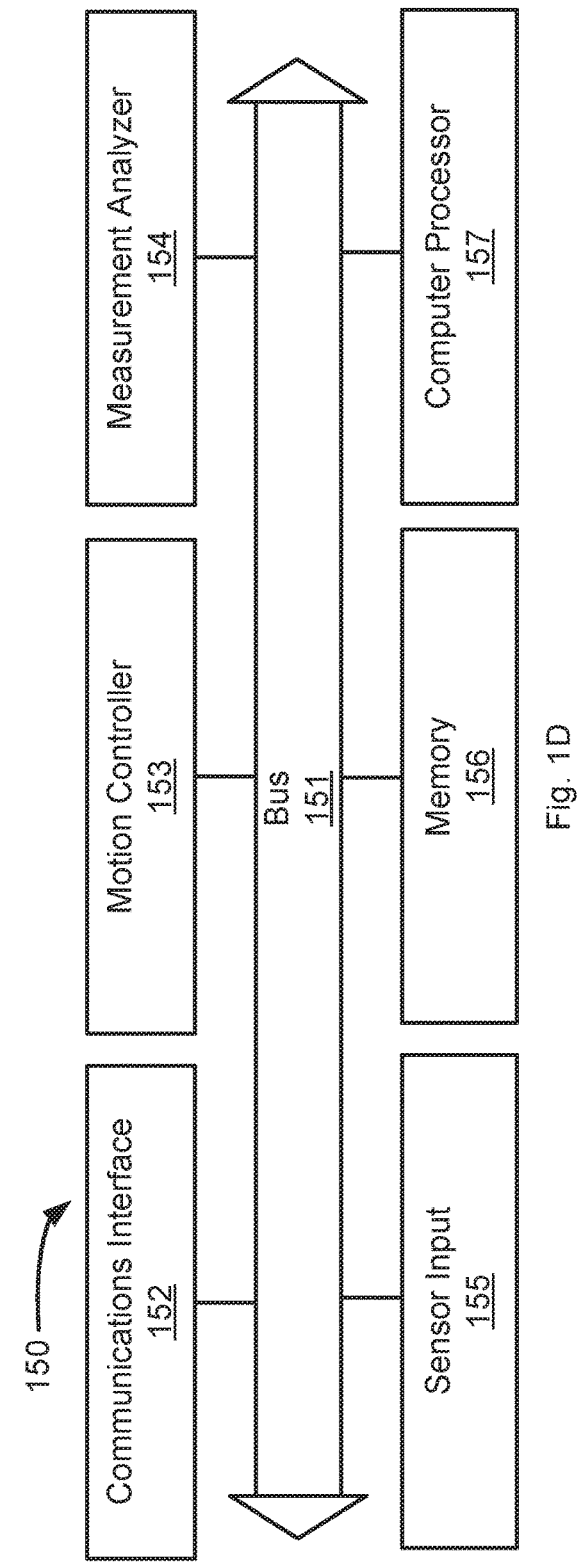

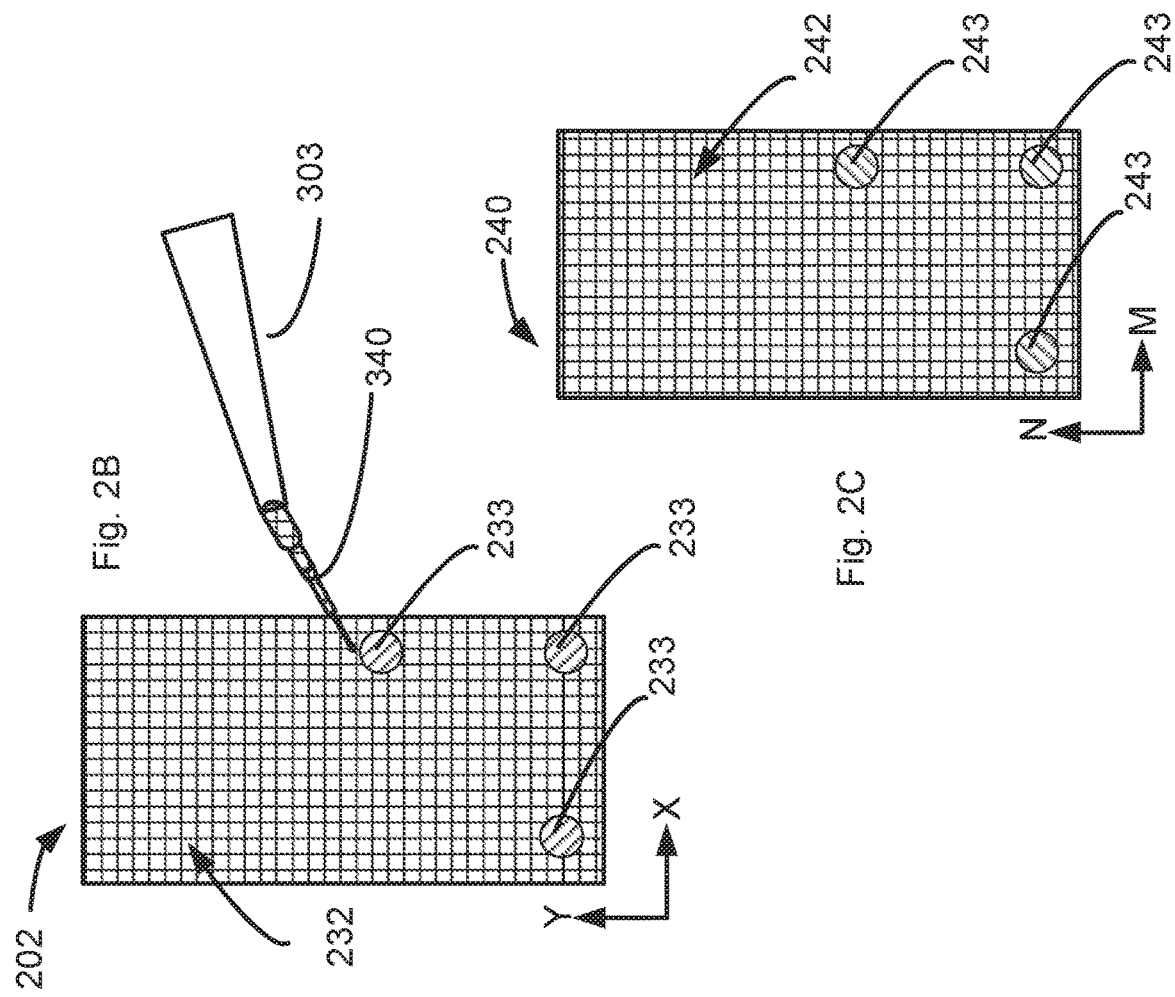
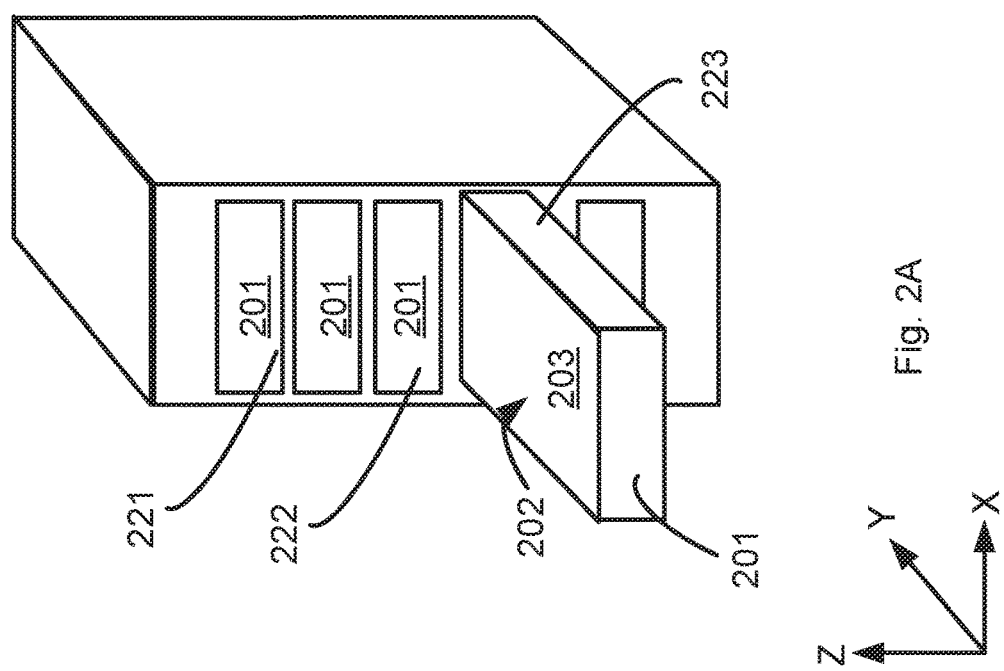

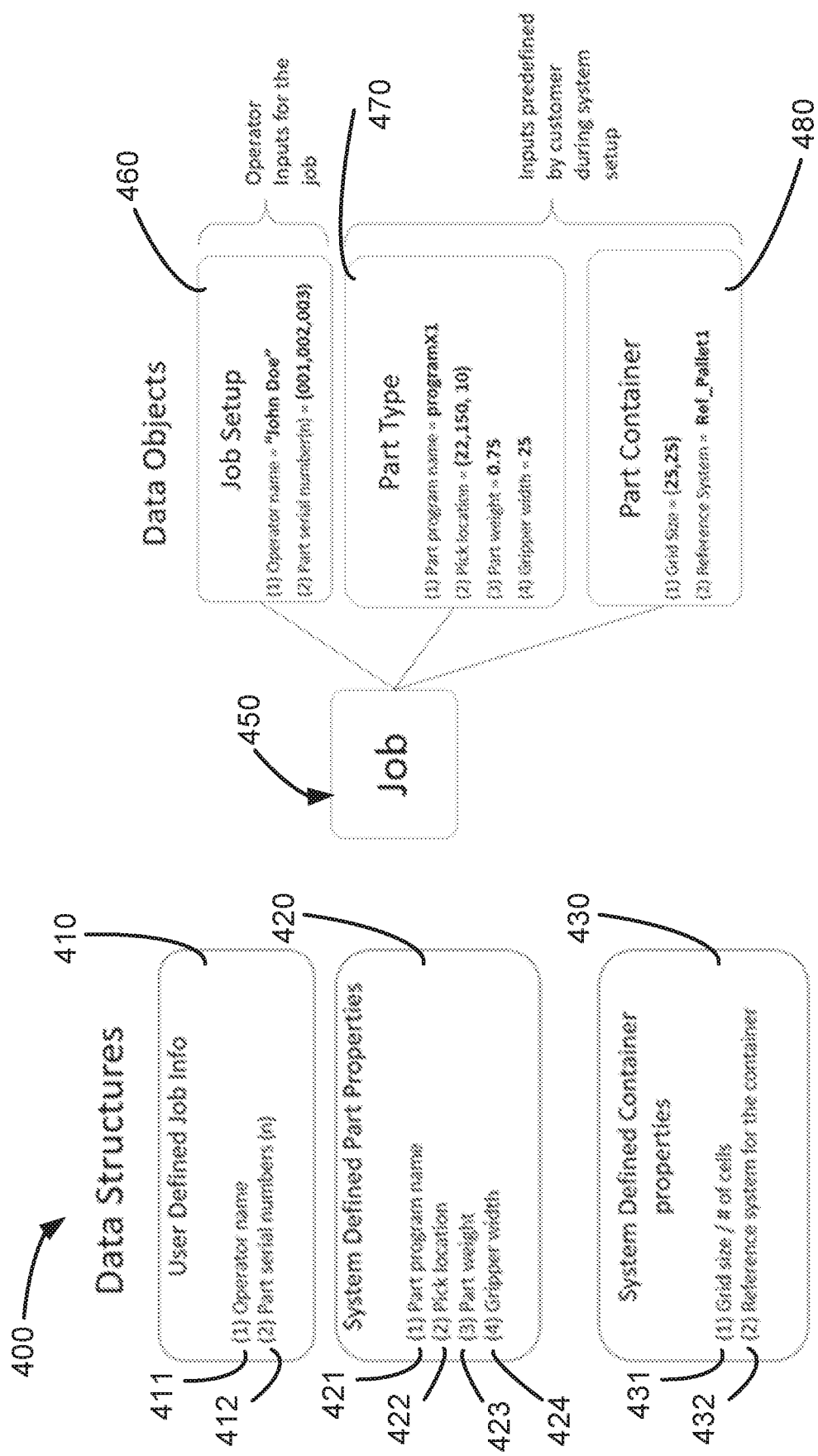

AUTOMATED INSPECTION PROCESS FOR BATCH PRODUCTION

RELATED APPLICATIONS

This application claims priority to: U.S. provisional patent application Ser. No. 62/844,160, filed May 7, 2019 and titled "Systems and Methods for Scheduling and Monitoring an Automated Inspection Process for Batch Production" and naming Jonathan J. O'Hare as inventor, and also claims priority to U.S. Provisional Application No. 62/844,162, filed May 7, 2019 and titled "Graphical User Interface for Scheduling and Monitoring and Automated Inspection Process for Batch Production" and naming Jonathan J. O'Hare as inventor.

This application claims priority to U.S. non-provisional application Ser. No. 16/868,800 filed May 7, 2020 and titled "Graphical User Interface for Scheduling and Monitoring an Automated Inspection Process for Batch Production," naming Jonathan J. O'Hare and Jonathan Dove as inventors.

The disclosures of all of the foregoing are incorporated herein by reference, in their entirety.

FIELD OF THE INVENTION

Illustrative embodiments relate generally to manufacturing, and more specifically to batch production methods.

BACKGROUND OF THE INVENTION

Coordinate measuring machines (CMMs) are the gold standard for accurately measuring a wide variety of different types of physical objects/work pieces. For example, CMMs can measure critical dimensions of aircraft engine components (e.g., jet engine blades), surgical tools, and turbine blades. Precise and accurate measurements help ensure that their underlying systems, such as an aircraft in the case of aircraft components, operate as specified.

CMMs often quickly and efficiently measure objects having relatively simple geometries. For example, a CMM probe (i.e., the part of the CMM directly gathering the measurement data) typically can move relatively quickly around the surface of a turbine blade to gather the desired information. In such a case, the time to measure the turbine blade can be much less than the time to produce the turbine blade.

A CMM is a highly versatile asset but requires a lot of operator inputs for operation. A skilled operator can use the CMM to measure a variety of workpieces.

Historically, CMMs have been implemented in quality labs, and have been heavily reliant on operators to perform measurement tasks. Due its heavy reliance on operators, however, automation of CMM operations has proven difficult.

It is also very costly to implement a fully automated inspection process that include operations beyond just the CMM automatically measuring a single workpiece after loading a measurement routine.

Consequently, CMMs found in production-type environments have historically been hardcoded and highly dedicated for specific measurement operations. Specifically, such a CMM is configured to repeat the same operations for each workpiece it measures.

Batch production describes the way in which batches of multiple products or variations of similar products are made so that manufacturers can be more flexible for changing market demand. Batch production is typical of many first and second tier suppliers in many industries, such as the automotive and aerospace industries to name but a few examples. It is common for these suppliers to have multiple customers who demand variants of similar products that are under continual change for improvement. The only way these suppliers can stay competitive in such a changing environment is to be able to adapt their manufacturing process quickly. However, the ability to make these quick process changes for greater flexibility usually comes at a cost in operational efficiency. Consequently, CMMs historically have not been amenable to batch production.

At the most fundamental level, material handling or "part tending" is a significant improvement in batch production environments. Some of the losses in efficiency in batch production is simply due to machine downtime between batch changes. The downtime can be attributed to factors that include: (1) cycle times for parts of different batches, and (2) the changeover time (speed at which tooling and or work holding devices can be changed to accommodate those different parts). This is where new intelligent software used with robots can make a significant impact.

Similar to most other automated manufacturing processes, the efficiency of an automated inspection process is heavily influenced by both variable part cycle times and the changeover times between batches. For example, an automated inspection process involving a CMM typically requires changing fixture setups, probe sensor tooling and inspection software routines between different part batches. These changes are typically implemented manually by an operator. It is also typical that the different part batches being setup for automated inspection have significantly different cycle times. The result of this is that the operator is unable to effectively plan when to be at the CMM to change the setup because the total cycle time of the batches are inconsistent. In manufacturing environments where this is the case, the typical solution is to either have an operator continuously monitor the inspection process at the CMM or be flexible to move around production and expect some downtime for the inspection process.

There has been a push in industry to become more flexible, i.e. "flexible manufacturing." To be more competitive many small and mid-sized companies have pursued short production runs of different products in order to supply only what is in demand at any given time. As a result, they change setups on the machinery often to handle this but the CMMs are a bottleneck because they are more complicated to operate and running measurements take a substantial amount of the total product cycle time.

SUMMARY OF VARIOUS EMBODIMENTS

Illustrative embodiments coordinate the actions of a plurality of apparatuses of an inspection system to execute a batch inspection job of each workpiece of a batch of a plurality of workpieces. To that end, illustrative embodiments provide to the inspection system a job object. Unlike a measuring routine for a coordinate measuring machine or a program for a robot, the job object is used to configure and coordinate the activities of multiple apparatuses in an inspection system, so that those multiple apparatuses work together to sequentially inspect each workpiece of a plurality (or batch) of workpieces. Some embodiments of the job object coordinate the operation of a robot with the operation of a coordinate measuring machine to sequentially inspect a plurality of objects when those objects are identical to one another. Some embodiments of the job object coordinate the operation of a robot with the operation of a coordinate measuring machine to sequentially inspect a plurality of objects when those objects are not identical to one another such that the actions of the robot or the coordinate measuring machine, or both, change from object to object.

In accordance with one embodiment, a computer-implemented method of operating a batch inspection system includes providing a set of workpieces to be inspected by the inspection system. The set of workpieces includes a first workpiece requiring a first set of inspection operations by an inspection instrument of the inspection system; and a second workpiece requiring a second set of inspection operations by the inspection instrument the inspection system, the second workpiece not identical to the first workpiece, and the second set of operations not identical to the first set of operations.

The method also includes, for the first workpiece, instantiating an instance of a first set of inspection operations (the first instance); and automatically providing the first workpiece to the inspection system and executing the first set of inspection operations on the first workpiece according to the first instance.

The method also includes subsequently, for the second workpiece, instantiating an instance a second set of inspection operations (the second instance); and contemporaneously and automatically providing the second workpiece to the inspection system, without providing an intervening workpiece to the inspection system after the first workpiece, and executing the second set of inspection operations on the second workpiece according to the second instance. In some embodiments, the first set of inspection operations includes a set of operations for measuring physical dimensions of the first workpiece. In some embodiments, the first set of inspection operations includes a set of operations for measuring surface roughness of the first workpiece.

Some embodiments also include providing a database storing a plurality of job objects, each job object of the plurality of job objects including the first set of inspection operations and a second set of inspection operations. In such embodiments, the method also includes obtaining from the database a job object having first set of inspection operations tailored to the first object, and a second set of inspection operations tailored for the second object.

In illustrative embodiments, the inspection instrument includes a coordinate measuring machine. In such embodiments, automatically providing the first workpiece to the inspection instrument includes automatically providing the first workpiece to the coordinate measuring machine; and executing the first set of operations on the first workpiece according to the first instance includes operating the coordinate measuring machine according to the first instance to measure the first workpiece.

In illustrative embodiments, the inspection instrument includes a coordinate measuring machine and the second set of inspection operations includes automatically obtaining a different probe by the coordinate measuring machine.

Another embodiment is directed to a method of configuring a batch inspection system having an inspection apparatus, a buffering apparatus, and a controller, the controller having a display device. The method includes displaying, on the display device, a graphical user interface, the graphical user interface including a layout manager having: a graphical container, the graphical container representing a corresponding physical container and having a grid pattern of precise grid locations to precisely represent corresponding locations within the corresponding physical container; and a layout area displaying a set of icons, each icon in the set of icons graphically representing one of (a) a workpiece to be inspected by the batch inspection system, or (b) a pallet holding a set of workpieces to be inspected by the batch inspection system.

The method also includes defining a batch job data object. Defining the batch job object includes receiving, via the graphical user interface from an operator, placement input to select each icon of the set of icons from the layout area and place each such icon into a respective precise grid location of the graphical container, said respective precise grid location representing a physical location of its corresponding workpiece or fixture in the buffering apparatus.

The method also includes providing the batch job data object to the inspection system for execution by the inspection system; and causing the inspection system to execute a hatch job to inspect each workpiece of a plurality of workpieces according to the batch job data object.

In some embodiments, the method further includes displaying, on the display device, a part program input field to receive from the operator, and store in the batch job data object, specification of a set of part programs, each part program in the set of part programs corresponding to a respective workpiece from the plurality of workpieces; and receiving, via the part program input field, specification of a set of part programs, and storing said specification in the batch job data object.

In some embodiments, each workpiece of the plurality of workpieces is a distinct species of workpiece from each other workpiece in the plurality of workpieces. In such embodiments, each part program in the set of part programs is distinct from each other each part program in the set of part programs, such that the inspection system performs a distinct set of inspection operations corresponding, respectively, to the species of each workpiece of the plurality of workpieces.

Some embodiment of the method also include displaying, on the display device, a set of data input fields, each data input field in the set of data input fields configured to receive specification of a respective job datum, the set of data input fields including one or more of: an operator name; a set of part serial numbers, each part serial number in the set of part serial numbers corresponding, respectively, to a respective workpiece of the plurality of workpieces; a set of part weights, each part weight in the set of part weights corresponding, respectively, to a respective workpiece of the plurality of workpieces; a set of gripper widths, each gripper width in the set of gripper widths corresponding, respectively, to a respective workpiece of the plurality of workpieces; and a specification of a part container, the specification including at least one of a grid size or a number of cells, and a reference system for the container.

Yet another embodiment is a batch inspection system for executing a batch job to inspect a batch having a plurality of workpieces. The system includes a coordinate measuring machine having a measuring space; a storage apparatus for storing a batch of workpieces to be inspected by the coordinate measuring machine; a robot configured to sequentially retrieve, from the storage apparatus, each workpiece of the batch of workpieces, and configured to deliver each such workpiece to the measuring space of the coordinate measuring machine; and a control computer having a display, the control computer in control communication with the coordinate measuring machine and the robot, the control computer configured the execute instructions which, when executed, cause display on the display device of a user interface. The user interface includes a graphical user interface including a graphical container, the graphical container representing a corresponding physical container and having graphical locations to precisely represent corresponding physical locations within the corresponding physical container; and a layout area displaying a set of icons, each icon in the set of icons graphically representing one of (a) a workpiece to be inspected by the batch inspection system, or (b) a pallet holding a set of workpieces to be inspected by the batch inspection system.

In such systems, the control computer is further configured to receive, via the graphical user interface, and store in a batch job object, operator input defining the batch job data object to configure the coordinate measuring machine and the robot to inspect each of the plurality of workpieces in the batch.

In some embodiments, the control computer is further configured to provide the batch job data object to the coordinate measuring machine and the robot for execution of the batch job, according to the batch job data object, by the coordinate measuring machine and the robot.

In some embodiments, the control computer is further configured to receive, from the operator, control input to control execution of the batch job.

In some embodiments, the graphical user interface is configured to receive input from the operator to select an icon from the layout area and place that icon into the graphical container to precisely indicate the location, in a storage apparatus, of a workpiece corresponding to the icon.

In some embodiments, the graphical user interface is configured to receive input from the operator to select each icon of a plurality of icons from the layout area and place each such icon into the graphical container to precisely indicate the location, in a storage apparatus, of a corresponding workpiece.

In some embodiments, the container includes predetermined orientation points, and the graphical user interface is configured to receive input from the operator to orient the graphical container to the container using the orientation points.

In some embodiments, the container includes predetermined orientation points, and the graphical container includes a set of reference points, each reference point in the set of reference points corresponding to a one of the orientation points on the container, and wherein the graphical user interface is configured to receive input from the operator and the robot to orient the graphical container to the container.

Some embodiments of the user interface further include a part program input field to receive from the operator, and store in the batch job data object, specification of a set of part programs, each part program in the set of part programs corresponding to a respective workpiece from the plurality of workpieces.

Some embodiments of the user interface also include a set of data input fields, each data input field in the set of data input fields configured to receive specification of a respective job datum, the set of data input fields including one or more of: an operator name; a set of part serial numbers, each part serial number in the set of part serial numbers corresponding, respectively, to a respective workpiece of the plurality of workpieces; and a specification of a part container, the specification including at least one of a grid size or a number of cells, and a reference system for the container.

Some embodiments of the user interface also include a set of data input fields, each data input field in the set of data input fields configured to receive specification of a respective job datum, the set of data input fields including one or more of: a set of part weights, each part weight in the set of part weights corresponding, respectively, to a respective workpiece of the plurality of workpieces; and a set of gripper widths, each gripper width in the set of gripper widths corresponding, respectively, to a respective workpiece of the plurality of workpieces.

Various embodiments include systems and methods that use a database of templates to manage workpiece variation for a continuous automated process

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1A schematically illustrates an embodiment of a workpiece processing system that includes at least one inspection instrument;

FIG. 1C schematically illustrates an embodiment of a workpiece;

FIG. 1D an embodiment of a control system for a coordinate measuring machine;

FIG. 1E schematically illustrates an embodiment of a manual user interface for a coordinate measuring machine;

FIG. 2A and FIG. 2B schematically illustrate an embodiment of a workpiece holding apparatus;

FIG. 2C schematically illustrates an embodiment of a pallet;

FIG. 4A schematically illustrates an embodiment of a data structure;

FIG. 4B schematically illustrates an embodiment of a job object;

DESCRIPTION OF ILLUSTRATIVE EMBODIMENTS

Figure 1B:
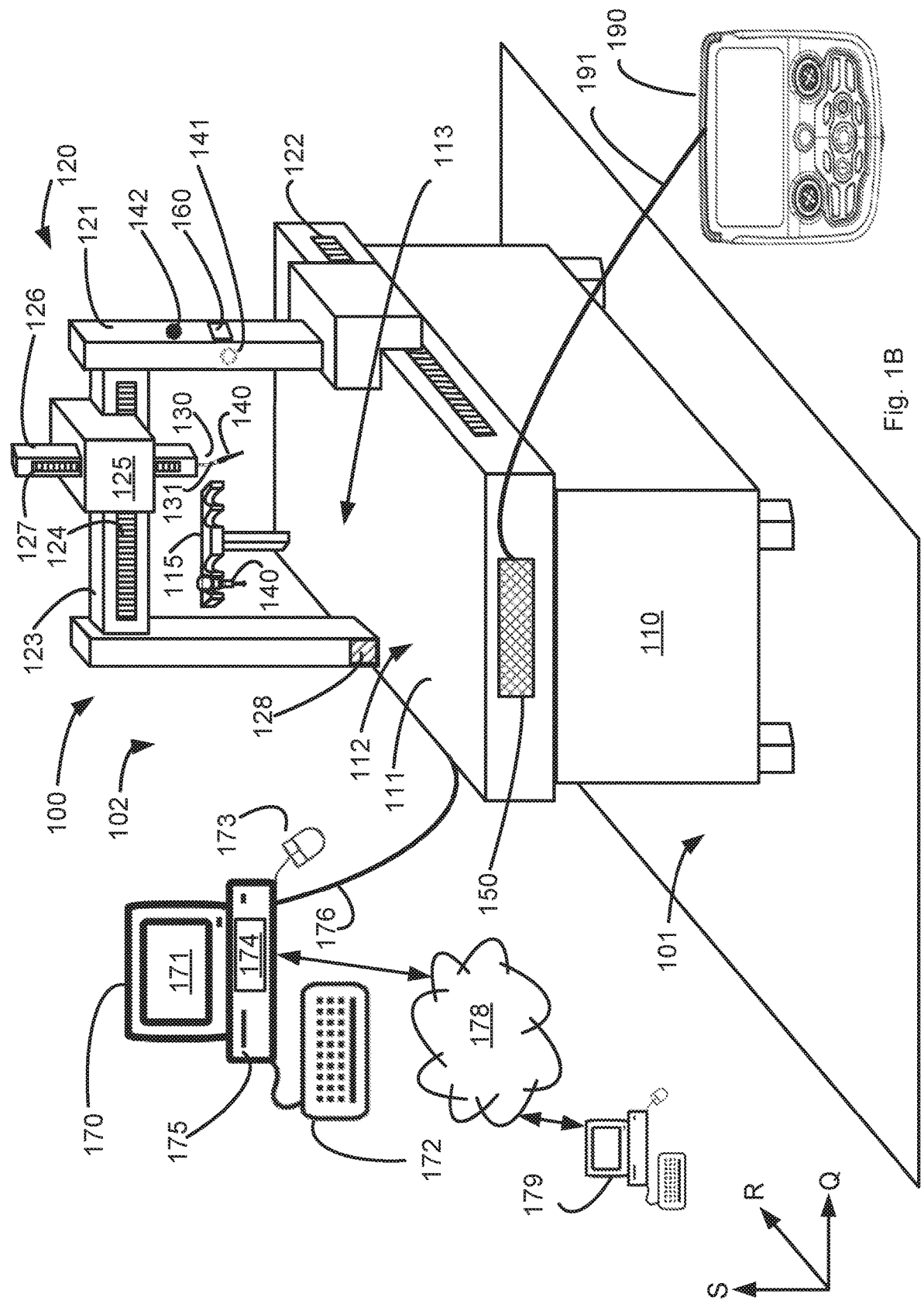
FIG. 1B schematically illustrates an embodiment of a coordinate measuring machine.

Various embodiments disclosed herein address several shortcomings and problems in the art of inspecting workpieces. Inspection of a workpiece may be performed by an inspection instrument, such as a coordinate measuring machine for example, but conventional methods and systems present a number of problems. For example, the complexity of setting-up and using a coordinate measuring machine has traditionally confined the use of coordinate measuring machines to quality-control labs that sample only a subset of workpieces produced, or other operations that are not part of the production line.

Setting-up a coordinate measuring machine conventionally requires a highly-trained operator to provide and attach to the coordinate measuring machine a probe or other sensor appropriate for the workpiece to be inspected, and to operate a control computer to run a routine of measurement operations specialized to inspect the workpiece to be measured. In addition to requiring the highly-trained operator, such setup conventionally requires significant downtime for the coordinate measuring machine, resulting in loss of productivity for the coordinate measuring machine and the workflow of which the coordinate measuring machine is a part.

In addition to requiring a highly-trained and/or experienced operator, operation of the coordinate measuring machine conventionally requires the operator to attend continuously to the coordinate measuring machine, preventing that operator from attending to other machines or performing other tasks associated with workpiece production.

These problems are present in general inspection procedures, but are particularly acute when several non-identical workpieces are to be inspected. For example, an assembly may be produced by assembling several constituent parts, each of the constituent parts different from (i.e., not nominally identical to) the others. Production of some assemblies requires that the constituent parts be pre-selected into a collection, as in a kit for example, and inspected prior to assembly to make sure those specific parts can be successfully integrated into the assembly. In other words, even if each constituent part meets its respective specification, the collection of pre-selected parts sometimes may fail to integrate into an assembly that will meet the assembly's specification. Inspection of each such part (e.g., each part in the collection for a given assembly) by a given coordinate measuring machine may require a respective coordinate measuring machine probe and a respective coordinate measuring machine routine, but the downtime and effort required to set-up the coordinate measuring machine for the first such part, and then to stop the coordinate measuring machine and reconfigure the coordinate measuring machine for each subsequent, non-identical part, is prohibitive and impedes the productivity and efficient use of the coordinate measuring machine.

To those ends, some embodiments described herein present systems, methods and user interfaces that address and solve some or all of the foregoing problems. For example, illustrative embodiments enable integration of an inspection instrument (e.g., a coordinate measuring machine) into a production line as an integral part of a batch inspection process. Among other things, such embodiments enable automatic sequential inspection of a series of workpieces, whether each workpiece is identical to the others in the series, or whether each workpiece is a distinct (non-identical species) from its sequential predecessor and/or sequential successor, all without the downtime and operator invention described above.

Some embodiments also present systems, methods and user interfaces that enable a robot to sequentially obtain each workpiece in a series of workpieces, and deliver each such workpiece to a coordinate measuring machine for inspection in a batch inspection process. Among other benefits, this allows entry-level labor (e.g., rather than requiring highly-trained and/or experienced operators) to monitor and operate the system. Intuitive user interfaces reduce training requirements for such operators.

Some embodiments also present systems, methods and user interfaces that enable an operator to efficiently monitor and control a batch inspection process. For example, illustrative embodiments enable an operator to schedule a batch inspection process; initiate a batch inspection process; pause a running batch inspection process; and/or change the priority level of a batch inspection process.

Certain aspects of the present disclosure provide a graphical user interface for interacting with the integrated software program in order to, for example, conduct supervisory control of the batch loading system. Conventional graphical user interfaces for use with coordinate measuring machines lack the ability to establish a batch inspection process, monitor such a process, coordinate the operations of multiply apparatuses, and/or control such a process. Instead, conventional graphical user interfaces for use with coordinate measuring machines have been limited to, for example, graphical user interface for performing a diagnostics or calibration procedure of the coordinate measuring machine, or adapting a measuring machine to one particular workpiece to be measured by a coordinate measuring machine.

Certain examples of the graphical user interface provide the ability to:

(i) Create data objects containing the part properties for different batches of parts, prior to using the batch loading system, so the data objects may be reused by the operator when scheduling new jobs;

(ii) Define a data structure with user-defined trace fields for job tracking so the data structure may be saved as an operator input template and reusable by the operator;

(iii) Define a queue for scheduling those batches for execution of parts in those batches on the automated measuring system or CMM;

(iv) Change the schedule or reprioritize the jobs in queue prior to execution on the automated measuring system or CMM at any time, either at the system or remotely;

(v) Monitor the execution status of automated measuring system or CMM at any time, either at the system or remotely;

(vi) Monitor the execution status of the robot at any time, either at the system or remotely; and (vii) Monitor the progress of the job being processed by the automated measuring system or CMM for completion of the respective operation.

In some embodiments, the graphical user interface enables monitoring of the batch's progress through a visual representation of the pallet, drawer or shelf, where the parts can be represented as geometric shapes or images in their respective geometric location and color coded to show their status. In some embodiments, the geometric shapes or images representing each individual part can be selected to show the part's respective trace data and detailed status information.

Such embodiments enable an inspection process to run as part of a production line; to run continuously; and increase the efficiency and throughput of the inspection process and production line of which the inspection process and inspection instruments are a part.

Illustrative embodiments relate to a system having a batch inspection system that includes a workpiece inspection system 40 (e.g., coordinate measuring machine), a part buffering apparatus 20, automated part transfer mechanisms 30, and software and/or hardware for the supervisory control of the whole system. In some embodiments, the supervisory control is implemented as software residing on a computer 50 (e.g., a personal computer), often in the form of SCADA software ("supervisory control and data acquisition" software), and acts as the "master" coordinating the "slaves," controllers of the automated part transfer mechanisms (e.g., a robot) and inspection machine (e.g., the coordinate measuring machine). Some illustrative embodiments use templates to aid in the description of workpieces and workpiece related information used for an automated measurement/inspection process.

Accordingly, illustrative embodiments enable a user to organize an inspection job on a plurality of parts delivered to the part buffering apparatus, track different properties of the parts to be inspected, and enable a number of benefits. Among others, those benefits include (1) the batch inspection system being capable of seamlessly inspecting various different types of parts in batch processes, (2) the ability to monitor the status of the different system components and (3) the ability to track the progress and status of the inspection process, and the status and progress of the inspection of individual workpieces.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Definitions: As used in this description and the accompanying claims, the following terms shall have the meanings indicated, unless the context otherwise requires.

The term "contemporaneously" in the context of providing workpieces to an inspection system, means sequentially and consecutively providing at least two workpieces to an inspection system without taking the inspection system offline for manual retooling.

A "set" includes at least one member. For example, and without limiting the generality of the definition, a set of workpieces includes at least one workpiece.

The term "workpiece" means an object to be measured by a coordinate measuring machine, such as a manufactured component, for example. The term "part," as used herein to refer to an object, is synonymous with the term "workpiece."

The workpieces in some illustrative embodiments described below may include jet turbine blades, orthopaedic implants, automotive powertrain components, and consumer electronics, to name but a few examples.

A "workholder" is a device that couples to a workpiece, for example when the workpiece is on a coordinate measuring machine or a storage apparatus, and/or while being moved. A "CMM fixture" is a species of workholder used to hold a workpiece while the workpiece is inspected by a coordinate measuring machine. A "part fixture" is a species of workholder used to hold a workpiece while the workpiece is stored in a storage apparatus or buffering facility, and in some embodiments when the workpiece is moved from the storage apparatus or buffering facility to a coordinate measuring machine.

Environment

FIG. 1A schematically illustrates a working environment for various embodiments. As shown, the environment schematically illustrates an inspection system 10 that includes an inspection apparatus 40 to inspect each of a plurality of workpieces. Prior to arriving at the inspection apparatus 40, the workpieces may be processed by one or more prior workstations, and be provided on a buffering apparatus 20. Each workpiece is then retrieved from the buffering apparatus 20 by workpiece handling apparatus 30 (e.g., a robot), and delivered to the inspection apparatus 40 by that workpiece handling apparatus 30.

The inspection system 10 may be controlled by a control computer 50, which is in communication with at least one apparatus of the inspection system 10. Among other things, the control computer 50 provides control information or signals to the apparatuses of the inspection system 10. In some embodiments, the control computer 50 is in control communication with a plurality of apparatuses of the inspection system 10, so each such apparatus receives control communication directly from the control computer 50. In other embodiments, the control computer 50 is in communication with a subset of the apparatuses of the inspection system 10, and each apparatus of the inspection system passes control information to subsequent apparatuses, so that the control information moves through the system 10 along with an associated workpiece.

Coordinate Measuring Machine 100

The inspection apparatus 40 in FIG. 1A may be, in illustrative embodiments, a coordinate measuring machine. As known by those in the art, a coordinate measuring machine (or "CMM") 100 is a system configured to measure one or more features of a workpiece.

FIGS. 1B-1E schematically illustrate a coordinate measuring machine 100 (hereinafter "CMM 100") that may be configured in accordance with illustrative embodiments.

As known by those in the art, a CMM is a system configured to measure one or more features of a workpiece 180. An illustrative embodiment of a workpiece 180 is schematically illustrated in FIG. 1C. Typically, a workpiece 180 has a specified shape with specified dimensions, which may be referred-to collectively as the "geometry" 181 of the workpiece 180. As an example, a workpiece 180 may have an edge 182, and a corner 183. A workpiece 180 may also have surfaces, such as a flat surface 184, and a curved surface 185. A meeting of two surfaces may create an inside angle 187. Moreover, each surface may have physical characteristic such as waviness 188 and/or surface finish 189, as known in the art. A workpiece 180 may also have a cavity 186, which may also be an aperture through the workpiece 180. As known in the art, a cavity 186 may have dimensions such as width and depth, which may in turn define an aspect ratio of the cavity 186.

CMM Base

In the illustrative embodiment of FIG. 1B, the CMM 100 includes a base 110 having a table 111. The table 111 of the CMM 100 defines an A-R plane 112 that typically is parallel to the plane of the floor 101, and an S-axis normal to the A-R plane, and a corresponding Q-S plane and R-S plane. The table 111 also defines a boundary of a measuring space 113 above the table 111. In some embodiments, the CMM 100 includes a probe rack 115 configured to hold one or more measuring sensors 140. A moveable part of the CMM 100 may move to the probe rack 115 and place a measuring sensor 140 into the probe rack 115, and/or remove another measuring sensor 140 from the probe rack 115.

Moveable Parts

The CMM 100 also has movable features (collectively, 120) arranged to move and orient a measuring sensor 140 (and in some embodiments, a plurality of such devices) relative to the workpiece 180. As described below, movable features of the CMM 100 are configured to move and orient the measuring sensor 140, relative to the workpiece 180, in one dimension (Q-axis; R-axis; or S-axis), two dimensions (Q-R plane; Q-S plane; or R-S plane), or three dimensions (a volume defined by the Q-axis, R-axis, and S-axis). Accordingly, the CMM 100 is configured to measure the location of one or more features of the workpiece 180.

The CMM 100 of FIG. 1B is known as a "bridge" CMM. Movable features 120 of the bridge CMM 100 include a bridge 123 movably coupled to the base 110 by legs 121. The bridge 123 and legs 121 are controllably movable relative to the base 110 along the R-axis.

To facilitate motion of the legs relative to the base 110, the legs 121 may be coupled to the base 110 by one or bearings 128. As known in the art, a bearing may be a roller bearing or an air bearing, to name but a few examples.

The movable features also include a carriage 125 movably coupled to the bridge 123. The carriage is configured to controllably move in the Q-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the S-axis. The position in the S-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a workpiece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The moveable joint 131 allows the orientation of the measuring sensor 140 to be controllably adjusted relative to the arm 130, to provide to the measuring sensor 140 additional degrees of freedom in the Q-axis, R-axis, and/or S-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the Q-R plane. In such embodiments, the CMM 100 moves the workpiece 180 relative to the measuring sensor.

In other embodiments, which may be generally referred-to as "horizontal arm" CMMs, the bridge 123 is movably coupled to the base 110 to extend in the S-axis, and to be controllably movable along the R-axis. In such a CMM, the arm 130 is controllably extendable in the S-axis, and controllably movable up and down the bridge 123 in the S-axis.

In yet other embodiments, the arm 130 is articulated. One end of the arm 130 is fixed to the base 110, and a distal end of the arm 130 is movable relative to the base 110 in one, two or three dimensions relative to a workpiece 180 in the measuring space 113.

Sensors

In some embodiments, the measuring sensor 140 may be a tactile probe (configured to detect the location of a point on the workpiece 180 by contacting a probe tip to the workpiece 180, as known in the art), a non-contact probe (configured to detect the location of a point on the workpiece 180 without physically contacting the workpiece 180), such as a capacitive probe or an inductive probe as known in the art, or an optical probe (configured to optically detect the location of a point on the workpiece 180), to name but a few examples.

In some embodiments, the measuring sensor 140 is a vision sensor that "sees" the workpiece 180. Such a vision sensor may be a camera capable of focusing on the workpiece 180, or the measurement space 113, and configured to capture and record still images or video images. Such images, and/or pixels within such images, may be analyzed to locate the workpiece 180; determine the placement and/or orientation of the workpiece 180; identify the workpiece 180; and/or measure the workpiece 180, to name but a few examples.

Some embodiments of a CMM 100 may include one, or more than one, camera 141 configured such that the measurement space 113 is within the field of view of the camera 141. Such a camera 141 may be in addition to a measuring sensor 140. The camera 141 may be a digital camera configured to capture still images and/or video images of the measurement space 113, a workpiece 180 on the CMM 100, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the atmosphere around the CMM 100. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

In operation, the CMM 100 measures the workpiece 180 by moving the measuring sensor 140 relative to the workpiece 180 to measure the workpiece 180.

CMM Control System

Some embodiments of a CMM 100 include a control system 150 (or "controller" or "control logic") configured to control the CMM 100, and process data acquired by the CMM. FIG. 1D schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, non-transient digital memory (e.g., RAM or ROM) for storing data and/or computer code, including non-transient instructions for implementing some or all of the control system operations and methods. Alternately, or in addition, the computer processor 157 may be operably coupled to other non-transient digital memory, such as RAM or ROM, or a programmable non-transient memory circuit for storing such computer code and/or control data. Consequently, some or all of the functions of the controller 150 may be implemented in software configured to execute on the computer processor.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140 or camera 141. The sensor input 155 is configured to receive electronic signals from sensors, and in some embodiments to digitize such signals, using a digital to analog ("D/A") converter. The sensor input 155 is coupled to other modules of the control system 150 to provide to such other modules the (digitized) signals received from sensors.

The motion controller 153 is configured to cause motion of one or more of the movable features of the CMM 100. For example, under control of the computer processor 157, the motion controller 153 may send electrical control signals to one or more motors within the CMM 100 to cause movable features of the CMM 100 to move a measuring sensor 140 to various points within the measuring space 113 and take measurements of the workpiece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a workpiece 180 to be measured; a specification for a calibration artifact; an error map; and non-transient instructions executable on the computer processor 157, to name but a few examples. Such instructions may include, among other things, instructions for controlling the moveable features of the CMM 100 for measuring a workpiece 180 and/or a calibration artifact; instructions for analyzing measurement data; and instructions for correcting measurement data (e.g., with an error map).

The measurement analyzer 154 is configured to process measurement data received from one or more sensors, such as measuring sensor 140. In some embodiments, the measurement analyzer 154 may revise the measurement data, for example by modifying the measurement data using an error map, and/or compare the measurement data to a specification, for example to assess deviation between a workpiece 180 and a specification for that workpiece 180. To that end, the measurement analyzer 154 may be a programmed digital signal processor integrated circuit, as known in the art.

Alternately, or in addition, some embodiments couple the CMM 100 with an external computer (or "host computer") 170. In a manner similar to the control system 150, the host computer 170 has a computer processor such as those described above, and non-transient computer memory 174, in communication with the processor of the CMM 100. The memory 174 is configured to hold non-transient computer instructions capable of being executed by the processor, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name but two examples.

Because their relative positions are determined by the action of the movable features of the CMM 100, the CMM 100 may be considered as having knowledge of the relative locations of the base 110, and the workpiece 180. More particularly, the computer processor 157 and/or computer 170 control and store information about the motions of the movable features. Alternately, or in addition, the movable features 120 of some embodiments include sensors that sense the locations of the table 111 and/or measuring sensor 140, and report that data to the computer 170 and/or controller 150. The information about the motion and positions of the table and/or measuring sensor 140 of the CMM 100 may be recorded in terms of a one-dimensional (e.g., Q, R, S), two-dimensional (e.g., Q-R; Q-S; R-S) or three-dimensional (Q-R-S) coordinate system referenced to a point on the CMM 100.

Manual User Interface

Some CMMs also include a manual user interface 160. As shown, the manual user interface 160 may have controls (e.g., buttons; knobs, etc.) that allow an operator to manually operate the CMM 100. Among other things, the interface 160 may include controls that enable the operator to change the position of the measuring sensor 140 relative to the workpiece 180. For example, an operator can move the measuring sensor 140 in the Q-axis using controls 161, in the R-axis using controls 162, and/or in the S-axis using controls 163.

If the measuring sensor 140 is a vision sensor, or if the CMM 100 includes a camera 141, then the operator can manually move the sensor 140, camera 141, or change field of view of the vision sensor and/or camera using controls 165. The operator may also focus the vision sensor and/or camera 141 using control 166 (which may be a turnable knob in some embodiments) and capture and image, or control recording of video, using control 167.

As such, the movable features may respond to manual control, or be under control of the computer processor 157, to move the base 110 and/or the measuring sensor 140 relative to one another. Accordingly, this arrangement permits the object being measured to be presented to the measuring sensor 140 from a variety of angles, and in a variety of positions.

Embodiments of a CMM 100 include a mobile controller which may be referred-to as a jogbox (or "pendant") 190. The jogbox 190 includes a number of features that facilitate an operator's control of the coordinate measuring machine 100.

Figure 1F:
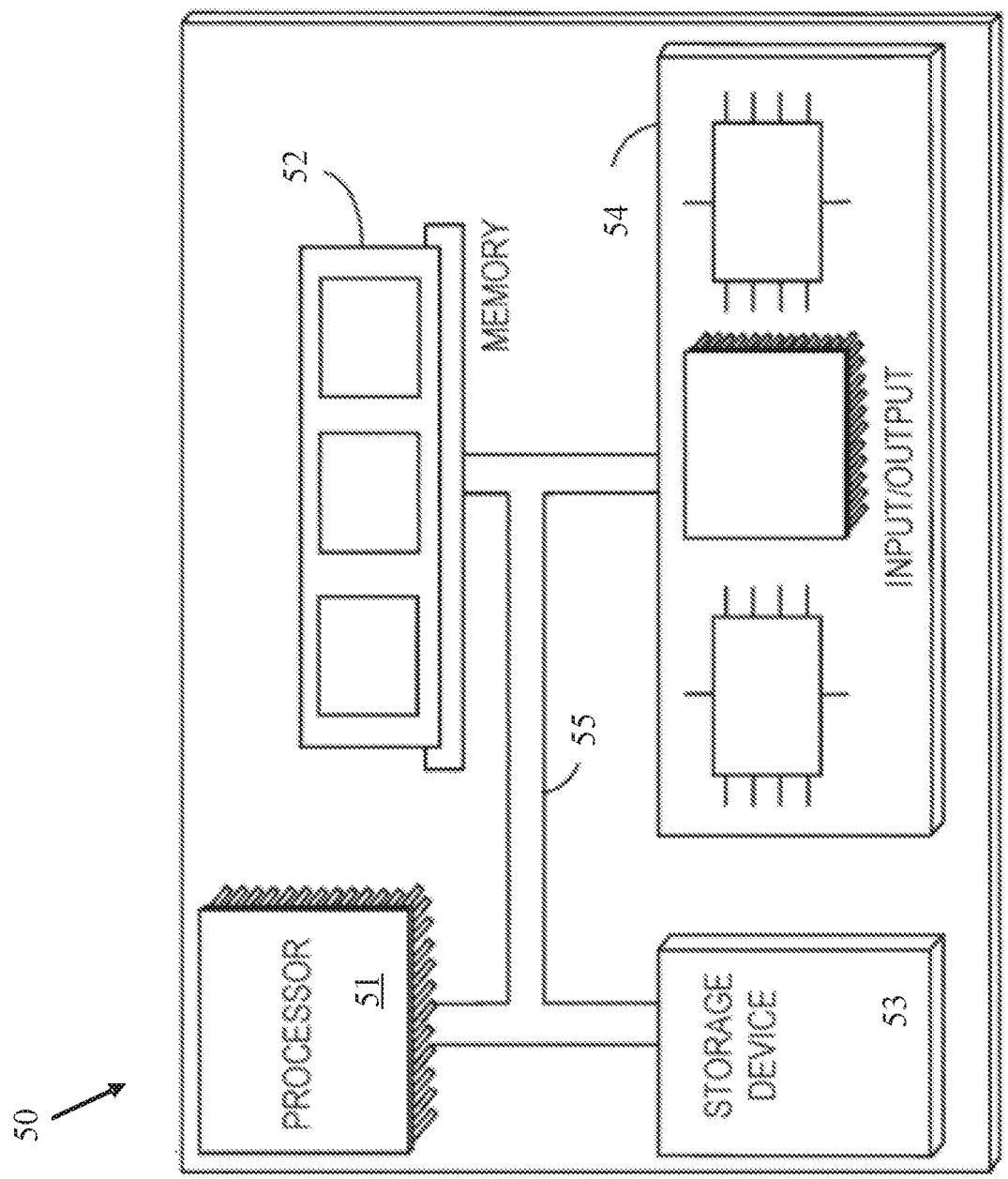
FIG. 1F schematically illustrates an embodiment of a central computer.

FIG. 1F schematically illustrates an embodiment of a central computer system (or "control computer") 50. In some embodiments, the central computer 50 is configured, by executable code, to perform functions described herein. For example, the illustrative methods and data structures could be executed by or used to control the system 10 described herein.

The central computer 50 includes a processor 51, a memory 52, a storage device 53, and an input/output device 54. Each of the components 51, 52, 53, and 54 can be interconnected, for example, using a system bus 55. The processor 51 is capable of processing instructions for execution within the computer system 50. The processor 51 can be a single-threaded processor, a multi-threaded processor, or similar device. The processor 51 is capable of processing instructions stored in the memory 52 or on the storage device 53, or in the database 13. The processor 51 may execute operations such as causing the batch loading system 10 to conduct an inspection job of one or more different types of parts 180 using one or more corresponding part fixtures 200.

The memory 52 stores information within the system 50. In some implementations, the memory 52 is a computer-readable medium. The memory 52 can, for example, be a volatile memory unit or a non-volatile memory unit. In some implementations, the memory 52 stores information related to jobs parameters or part trace data.

The storage device 53 is capable of providing mass storage for the system 50. In some implementations, the storage device 53 is a non-transitory computer-readable medium. The storage device 53 can include, for example, a hard disk device, an optical disk device, a solid-date drive, a flash drive, magnetic tape, or some other large capacity storage device. The storage device 53 may alternatively be a cloud storage device, e.g., a logical storage device including multiple physical storage devices distributed on a network and accessed using a network. In some implementations, the information stored on the memory 52 can also or instead be stored on the storage device 53.

The input/output device 54 provides input/output operations for the system 500. In some implementations, the input/output device 54 includes one or more of network interface devices (e.g., an Ethernet card), a serial communication device (e.g., an RS-232 10 port), and/or a wireless interface device (e.g., a short-range wireless communication device, an 802.11 card, a 3G wireless modem, or a 4G wireless modem). In some implementations, the input/output device 540 includes driver devices configured to receive input data and send output data to other input/output devices, e.g., a keyboard, a printer, and display devices (such as a GUI). In some implementations, mobile computing devices, mobile communication devices, and other devices are used.

In some implementations, the system 50 is a microcontroller. A microcontroller is a device that contains multiple elements of a computer system in a single electronics package. For example, the single electronics package could contain the processor 51, the memory 52, the storage device 53, and input/output devices 54.

Each of these components is operatively connected by any conventional interconnect mechanism. FIG. 1F simply shows a bus communicating each the components. Those skilled in the art should understand that this generalized representation can be modified to include other conventional direct or indirect connections. Accordingly, discussion of a bus is not intended to limit various embodiments.

Storage Apparatus 200

The buffering apparatus 20 in some embodiments includes a storage apparatus 200. An illustrative embodiment of a storage apparatus 200 is schematically illustrated in FIG. 2A. In this embodiment, the storage system 200 includes one or more storage containers 201 (e.g., drawers; shelves; some including one or more pallets) 201. The illustrative embodiment of FIG. 2A includes several storage containers 221, 222 and 223.

The storage system 200 defines a storage system coordinate system having three mutually orthogonal axes (axes X, Y and Z in FIG. 2A). The storage system coordinate system is independent of the CMM's coordinate systems (e.g., Q-R-S).

As schematically illustrated in FIG. 2A, each drawer or shelf 211 of a storage system 200 may have one or more storage plates 203 configured and disposed to hold the one or more workpieces 180 or pallets 240. A storage plate 203 may have a plate surface 202.

The surface 202 of the container 201 defines a two-dimensional coordinate system, in the X-Y plane in FIG. 2B. Illustrative embodiments of the container 201 include a set of physical reference features 233 that collectively define the orientation of the container 201 in that two-dimensional coordinate system. The two-dimensional (X-Y) coordinate system of the container 201 may be oriented to the three-dimensional coordinate system of the robot 300 by sequentially locating each such physical reference feature 233 with the robot (e.g., by touching each such physical reference feature with a robot probe 340 coupled to a robotic arm 302 of a robot 200), and recording, in the control computer 50 (e.g., through a user interface displayed by the computer 50), the coordinates in the three-dimensional coordinate system of the robot 300 of each such physical reference feature 233.

Some embodiments of the container 201 include a visible grid pattern 232 on the surface 202, the grid pattern 232 representing the two-dimensional coordinate system of the container 201.

A plurality of workpieces 180 may be stored directly on each container 201. Alternatively, or in addition, a plurality of workpieces 180 may be stored on one or more pallets 240 on each container 201.

FIG. 2C schematically illustrates an embodiment of a pallet 240. The pallet 240 is movable in that it can be placed onto a container 201, relocated on the container 201, and removed from the container 201.

The surface of the pallet 240 defines a 2-dimensional coordinate system (M-N in FIG. 2C).

Illustrative embodiments of the pallet 240 include a set of physical reference features 243 that collectively define the orientation of the pallet 240 in that two-dimensional coordinate system. The two-dimensional (M-N) coordinate system of the pallet 240 may be oriented to the three-dimensional coordinate system of the robot 300 by sequentially locating each such physical reference feature 243 with the robot (e.g., by touching each such physical reference feature with a robot probe 340 coupled to a robotic arm 302 of a robot 200), and recording, in the control computer 50 (e.g., through a user interface displayed by the computer 50), the coordinates in the three-dimensional coordinate system of the robot 300 of each such physical reference feature 243. Alternately, the two-dimensional (M-N) coordinate system of the pallet 240 may be oriented to the three-dimensional coordinate system of robot 300 by placing the pallet onto a container 201, which container 201 has been or will be oriented to the coordinate system of a robot 300.

Illustrative embodiments of the pallet 240 include a visible grid pattern 242.

Robot 300

Figure 3:
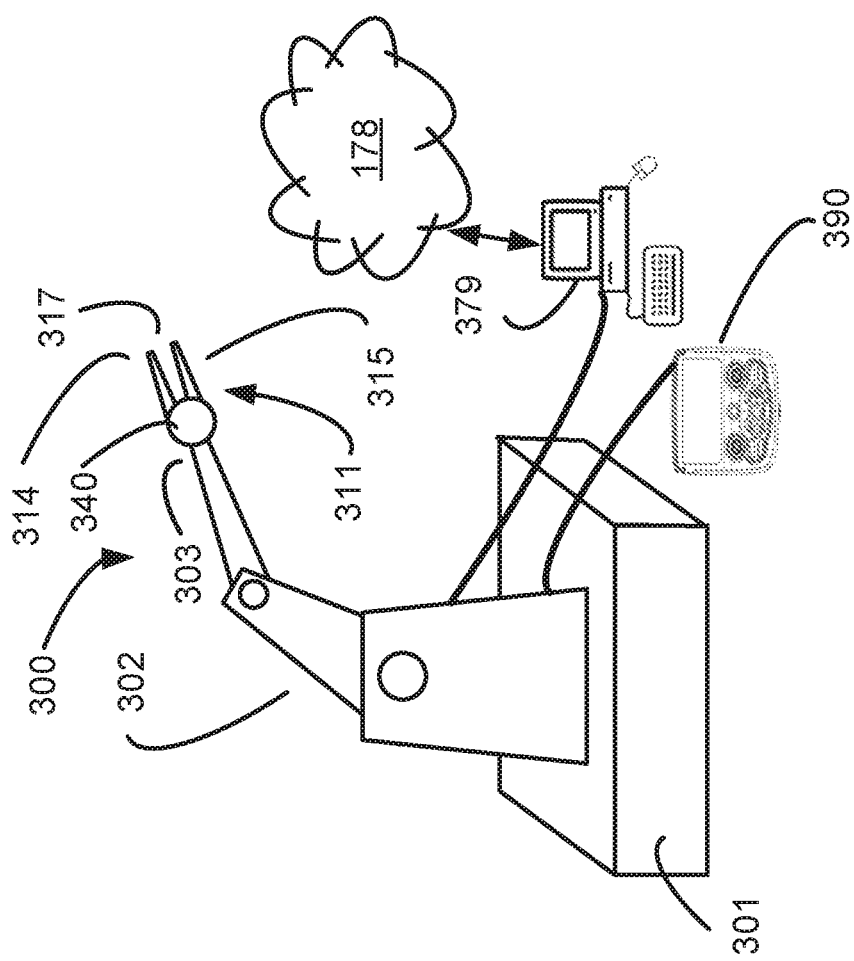
FIG. 3 schematically illustrates an embodiment of a workpiece placement robot.

A robot 300 is schematically illustrated in in FIG. 3.

In illustrative embodiments, robot 300 is disposed so that it can reach the drawer or shelf 201 of a storage apparatus 200, and each workpiece 180 of a set of workpieces disposed at the storage apparatus 200, as well as the table 111 of the coordinate measuring machine 100, and a workpiece on the coordinate measuring machine 100. When disposed in that manner, the robot 300 can transport a workpiece 180 from the drawer or shelf 201 to the measuring space 113 of the coordinate measuring machine 100, and can transport a workpiece 180 from the measuring space 113 of the coordinate measuring machine 100 to the drawer or shelf 201. To that end, the robot 300 in this embodiment has a gripper 311 at the end 303 of a movable, articulated arm 302.

In some embodiments, the gripper 311 has two or more fingers 314, 315 separated by a gap 317. The gripper 311 is configured to controllably close and open the fingers 314, 315 to decrease or increase the gap 317 (respectively) so as to grasp and release (respectively) a workpiece 180.

In illustrative embodiments, the robot 300 (e.g., motion of the robot arm 302 and/or motion of the gripper 311) is controlled by a robot controller. For example, in some embodiments, the robot 300 is controlled by robot control computer 379, or a robot control interface 390. In alternate embodiments, the robot 300 is controlled by the motion controller 153 or the host computer 170 of the coordinate measuring machine 100, which are separate and distinct from the robot control computer 379 and the robot control interface 390.

In illustrative embodiments, the robot arm 302 includes sensors configured to measure the location of the end 303 of the arm 302 relative to the base 301 of the robot 300.

In operation, the system 10 conducts one or more inspection jobs on the parts 180 presented by the part buffering apparatus 20. The jobs can include an inspection of each part 180 using the CMM 100. When the parts 180 arrive at the part buffering apparatus 20, the robot 300 takes a part 180 from one of the storage containers and places it on the CMM 100, or on a corresponding part fixture of the CMM 100, depending on the type of part 180 that is taken. With the part 180 on the CMM, the CMM 100 conducts the measurement process according to the parameters of the job in process.

Data Structures

FIG. 4A illustrates an embodiment of example data structures 400 (or "template") for use with one embodiment of the present invention. The data structures can include user-defined job information 410 that can include, for example, an operator name field 411, and a part serial number field 412 for serial numbers associate with physical workpieces 180 to be inspected as part of a batch inspection job conducted using the batch processing system 10 and controlled by one or more controllers 50 executing software having the data structures disclosed herein.

The data structures can also include fields 420 for inputs predefined during system setup, such as system defined part properties, including for example a field for part program name 421 (i.e., the name of a measurement routine to be run by a coordinate measuring machine 100) configured to receive and store the name of a program to be executed by an inspection instrument 40 (e.g., a CMM 100) to perform a set of inspection operations on workpieces of a given species, such as workpieces listed by serial number in field 412.

Fields for inputs predefined during system setup 420 may also include, for example, a field for receiving and storing the pick location 422 of each workpiece 180 in the batch. Each such pick location may be defined relative to the coordinate system of a storage apparatus 200, to enable robot 300 to retrieve each workpiece 180 from the storage apparatus 200 for delivery to an inspection instrument 40.

Fields for inputs predefined during system setup 420 may also include, for example, a field for receiving and storing the weight 423 of each workpiece.

Fields for inputs predefined during system setup 420 may also include, for example, a field for receiving and storing the gripper width 424 specified to configure the gripper 311 of robot 300 to enable to the gripper 311 to grasp each respective workpiece 180 while retrieving the workpiece 180 and delivering it to the measuring instrument 50.

In some embodiments, such fields may also include a field for receiving a storing (a) a specific work holding device or fixture required for the type of part, and/or (b) a coordinate reference system of the pallet, drawer or shelf containing parts, which will be used by the robot 300 to pick and place parts within that batch.

The data structures can also include fields 430 for receiving and storing system defined container properties 430, such as a field 431 for grid size and/or number of cells in the container. Some embodiments include a field 432 for receiving and storing information identifying a particular coordinate reference system of the pallet, drawer or shelf containing parts, which will be used by the robot 300 to pick and place parts within that batch (e.g., specific location of parts 180 in the container in order to enable to the robot 300 to precisely interact with, remove, and return parts 180).

In some embodiments, FIG. 4A is a user interface for entering the information described above.

Data Objects

In use, an operator may use the templates of FIG. 4A to create data objects to define a batch job. FIG. 4B illustrates an embodiment of a data object, which includes data structures of FIG. 4A, each with its various fields filled-in with data from either the operator (e.g., an entity running the batch inspection job) or the customer (e.g., a manufacturer of the parts 180).

Predefined Data Objects

Figures 5A, 5B:
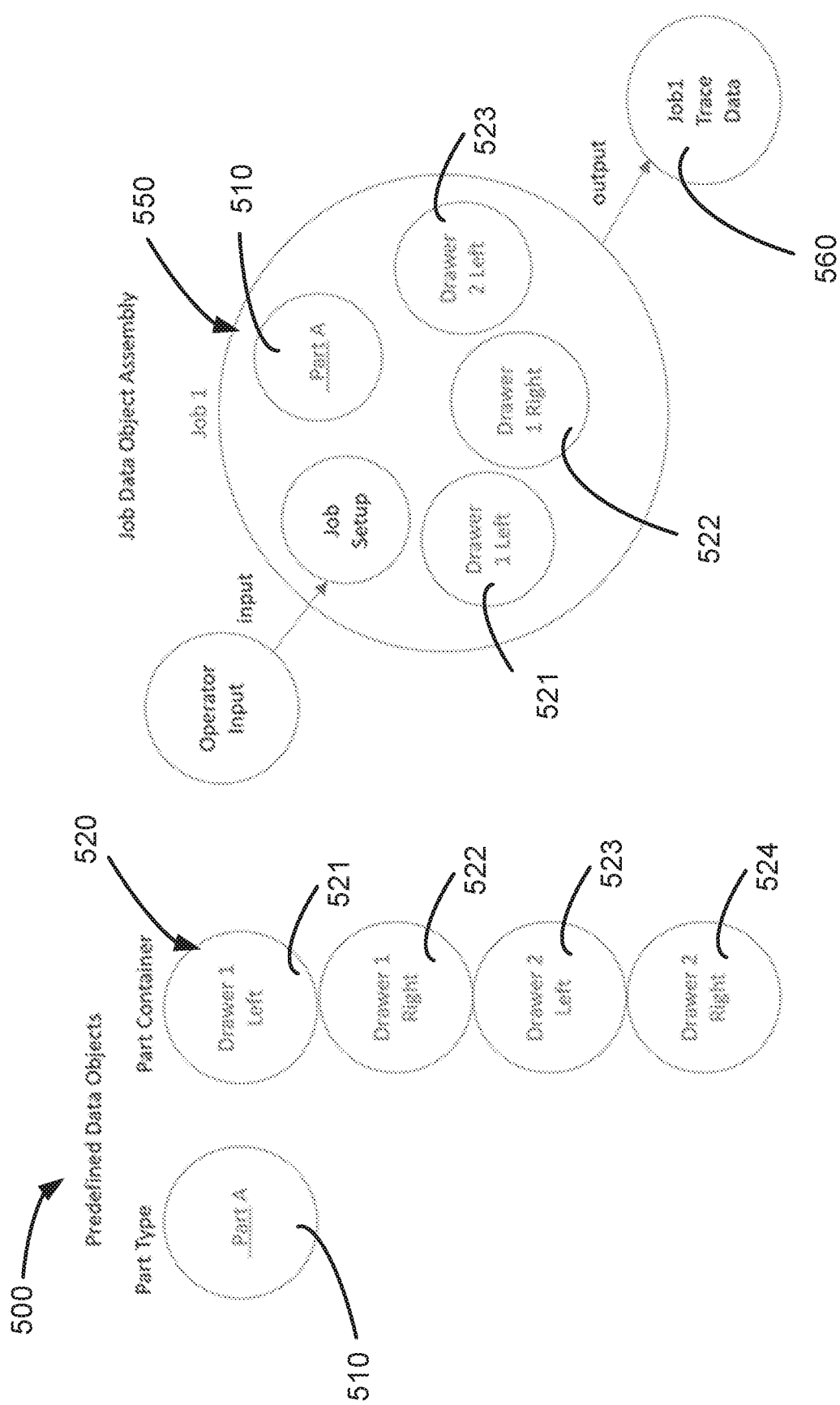
FIG. 5A schematically illustrates an embodiment of a predefined data object.
FIG. 5B schematically illustrates an embodiment of a job data object.

FIG. 5A illustrates the various predefined data objects associated with the operation of an inspection system 10. The predefined data objects can include data 510 relating to one or more types of parts to be delivered (e.g., "Part A"), such as the fixture to use for each workpiece, the inspection routine for each workpiece 180 conduct, and the thresholds for passing the inspection for each workpiece.

The predefined data objects 500 can also include data 520 relating to one or more types of containers delivering the parts (e.g., "Drawer 1 Left" 521, "Drawer 1 Right" 522, "Drawer 2 Left" 523, "Drawer 2 Right" 524), such as the particular location of the parts in the containers (e.g., coordinate references) and a layout of the various types parts in the container in order to, for example, facilitate efficient batching of similar inspection tasks on parts of the same type.

Job Data Object Assembly

The predefined data objects 500 can be used to define a job data object assembly 550, FIG. 5B. The job data object assembly 550 provides, to the inspection system 10, information used to coordinate the operations of multiple apparatuses of the inspection system to execute a batch inspection job. For example, in some embodiments, a job data object assembly 550 provides, to a control computer 50, information used by the control computer 50 to coordinate the operations of a coordinate measuring machine 100 and a robot 300 to measure each workpiece 180 of a plurality of workpieces in a batch.

In use, an operator provides some initial input to set up a batch inspection job by adding the respective job data to a job data object assembly 550. The job data object assembly can include other data objects related to the inspection process to be executed, such as part types and container types.

As the job is executed, and the various workpieces 180 in the storage containers 221, 222, 223 are inspected by the CMM 100, the job operation can output trace data of each workpiece 180, e.g., as a data object.

Trace data, generally, is data that allows post-execution (e.g., post-inspection) analysis of the job as its was executed, or during-execution monitoring and analysis of a job that is being executed. To that end, each instance of trace data is uniquely correlated to the execution of a specific job by the system 10. The trace data includes, for example, the results of the inspection process and corresponding information (e.g., serial number) about the workpieces 180 being inspected. Example trace fields in the trace data 560 may include, (a) a serial number or unique part identifier (UID) of each part loaded in a job, (b) setup information in part about the batch or batch process, (c) data that includes unique information for each part in the job, (d) operator information, such as the name of the operator, and (e) the start time of the job.

Using data objects organized in the batch jobs as illustrated enables the system 10 to process large volumes and/or many different types of workpieces 180 in a single job while generating trace data for each workpiece 180 inspected.

EXAMPLES

The following examples show how these data objects can be organized together in a computer-implemented method to conduct a job process that includes inspection operations on various batches of parts 180.

Example 1

The following is a pseudocode example (titled "Job_1") of the present disclosure, where Job_1 includes (1) user defined traceable information about the job, (2) predefined part type data object information referenced as Part_A, and (3) a container for Part_A called Drawer_1R containing an array of three parts with unique part identifiers in the form of serial numbers, 001, 002 and 003, containing their own part specific data, such as their cell locations in the container:

```
Job_1 {
    Operator Name = "John Doe"          ⎫
    Work Shift = "Shift-1"              ⎬        (1)
    Job Start Time = "2019-01-11::16Batch:42:01" ⎭
    Part Type = Part_A                  }        (2)
    Part Container = Drawer_1R {
Part Serial Number {                    ⎫
                                        ⎬        (3)
001{                                    ⎭
Cell Location (0,0)
}
002{
Cell Location (1,0)
}
003{
Cell Location (2,0)
}
    }
Part_A {
Work Holding = "Fixture_A"              ⎫
Inspection Routine = "C:\ \Inspection Software\Program_A.prg"  ⎬   (2)
}
```

Furthermore, in some examples, various embodiments include the ability for advance creation of trace fields configured to contain user defined traceable information about the job. These trace fields can be stored as their own data structure, which may be recalled as a Job Trace Template that is reusable by the operator for jobs requiring the same information for traceability purposes. For example:

Job Trace Template
    (user defined traceable fields)
    Trace Field #1: Operator Name
    Trace Field #2: Work Shift
    Trace Field #3: Job Start Time [YYYY-MM-DD:: hh.mm.ss]

In this example, a user defined Job Trace Template is similar to the batch setup information data structure in that it may be recalled for the ease of setting up new jobs by the operator. However, in some instances the data fields are not user defined.

Example 2

With regard to workflow and managing data, another embodiment of the present disclosure includes using data templates to separately define (1) information about the batches of parts, and (2) information about the individual parts as part of a batch.

The following is a pseudocode example of (1) information about the batches of parts:

```
<Batch>
    <Name>OP_40</Name>
    <CAD model>CV0123_OP40.stp</CAD model>
    <Inspection Program>CV0123_OP40.prg</Inspection Program>
    <Pick Points on Part> // tells robot where to place the
gripper on the part when picking it from its cell location
        <X>1.5</X>
        <Y>5.0</Y>
        <Z>0.5</Z>
    <Pick Points on Part>
    <Pallet Ref System>drawer1_refsy</Pallet Ref System>
</Batch>
```

The following is a pseudocode example of (2) information about the individual parts as part of a batch.

```
<Part>
    <Name>00012</Name> // this is the serial number or some unique
identifier of the individual part
    <Batch>OP_40</Batch>
    <Cell Location>          // this is where the part is loaded in the pallet
        <X>100</X>
        <Y>50</Y>
        <Z>0</Z>
    </Cell Location>
```

Implementing the data structures of the above example enables predefining what a batch is, such that an operator only needs to select the batch type (in this case it is "OP_40") and then define a minimal amount of part specific information as the parts are loaded into the buffer system (drawers in this case).

In addition, embodiments enable higher level operators to modify these data templates in order to add more fields of information if required. For example, a company manufacturing medical devices might require greater traceability and add more information fields for the batch info or each part used in their medical devices.

Figure 5C:
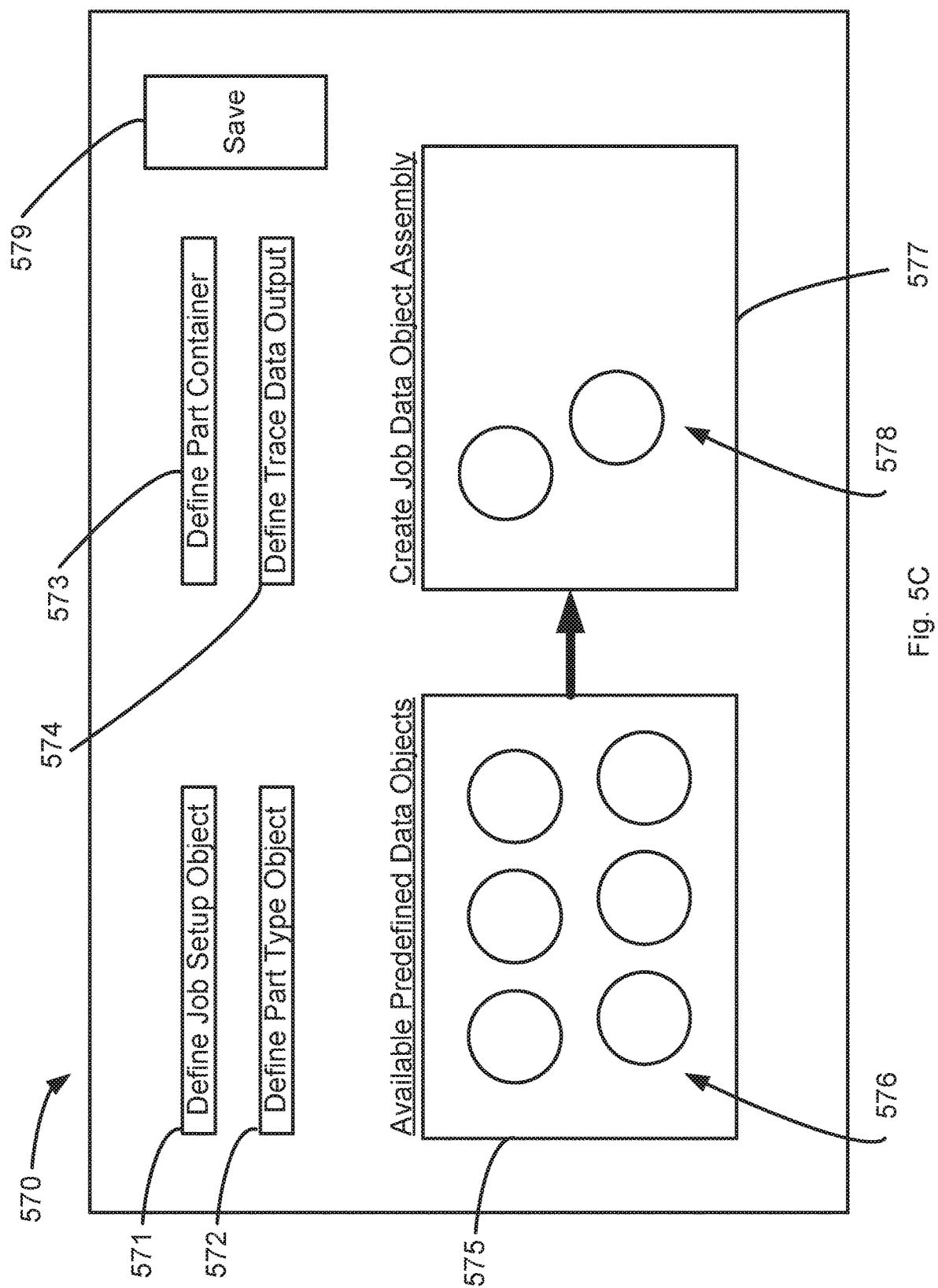
FIG. 5C schematically illustrates a user interface for defining data objects and job objects.

FIG. 5C schematically illustrates a user interface 570 configured to allow an operator 99 to define data objects, and to use data objects to define a job data object assembly.

User interface 570 includes a button 571 configured to allow the operator 99 to define a job setup object, such as job setup object 460. When the operator 99 clicks on button 571, the user interface 570 presents an input area having a plurality of input boxes corresponding to user-defined job information 410 (e.g., operator name field 411, part serial number field 411). The operator the enters such data and saves it to create a job setup object 460.

User interface 570 also includes a button 572 configured to allow the operator 99 to define a part type object 470. When the operator 99 clicks on button 572, the user interface 570 presents an input area having a plurality of input boxes corresponding to fields 420 for inputs predefined during system setup 420 (e.g., part program name 421; pick location 422, etc.). The operator the enters such data and saves it to create a job setup object 470.

User interface 570 also includes a button 573 configured to allow the operator 99 to define a part container object 480. When the operator 99 clicks on button 573, the user interface 570 presents an input area having a plurality of input boxes corresponding to fields 430 for inputs defining a container (e.g., field 431 for grid size and/or number of cells in the container; field 432 for receiving and storing information identifying a particular coordinate reference system for the container). The operator the enters such data and saves it to create a job setup object 480.

User interface 570 also includes a button 574 configured to allow the operator 99 to define trace data 560 for the batch job to track and produce.

User interface 570 also includes areas to enable an operator 99 to create a job data object assembly 550 from predefined data objects 500. The illustrative e embodiment of FIG. 5C includes an area 575 for displaying a set 576 of available predefined data objects. In operation, the operator 99 selects one or more of the available predefined data objects and places each such predefined data object into the job data object assembly area 577. FIG. 5C schematically illustrates a set 578 of predefined data objects after having been placed in the data object assembly area 578.

After using any one or more of the foregoing features, the operator 99 can save the input to a data object or job data object assembly 550 by using the Save button 579.

Conventional software systems do not have the flexibility of the embodiments described herein. Rather, conventional automation environments are usually implemented as turn-key inspection systems and hardcoded to do operate in one way, and often for a single type of part.

Graphical User Interface

Figure 6A:
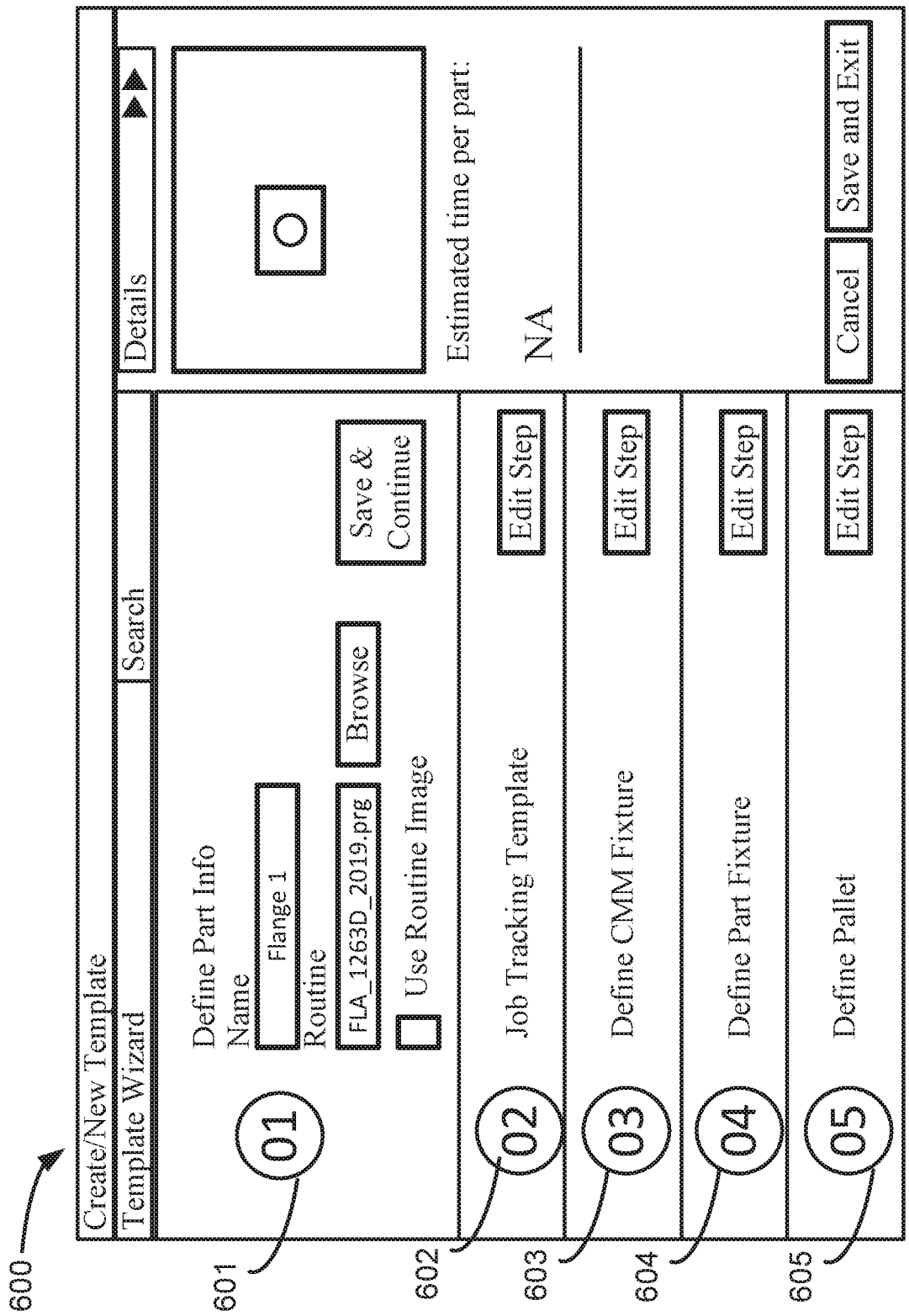
FIG. 6A schematically illustrates an embodiment of a job definition interface.
Figure 6B:
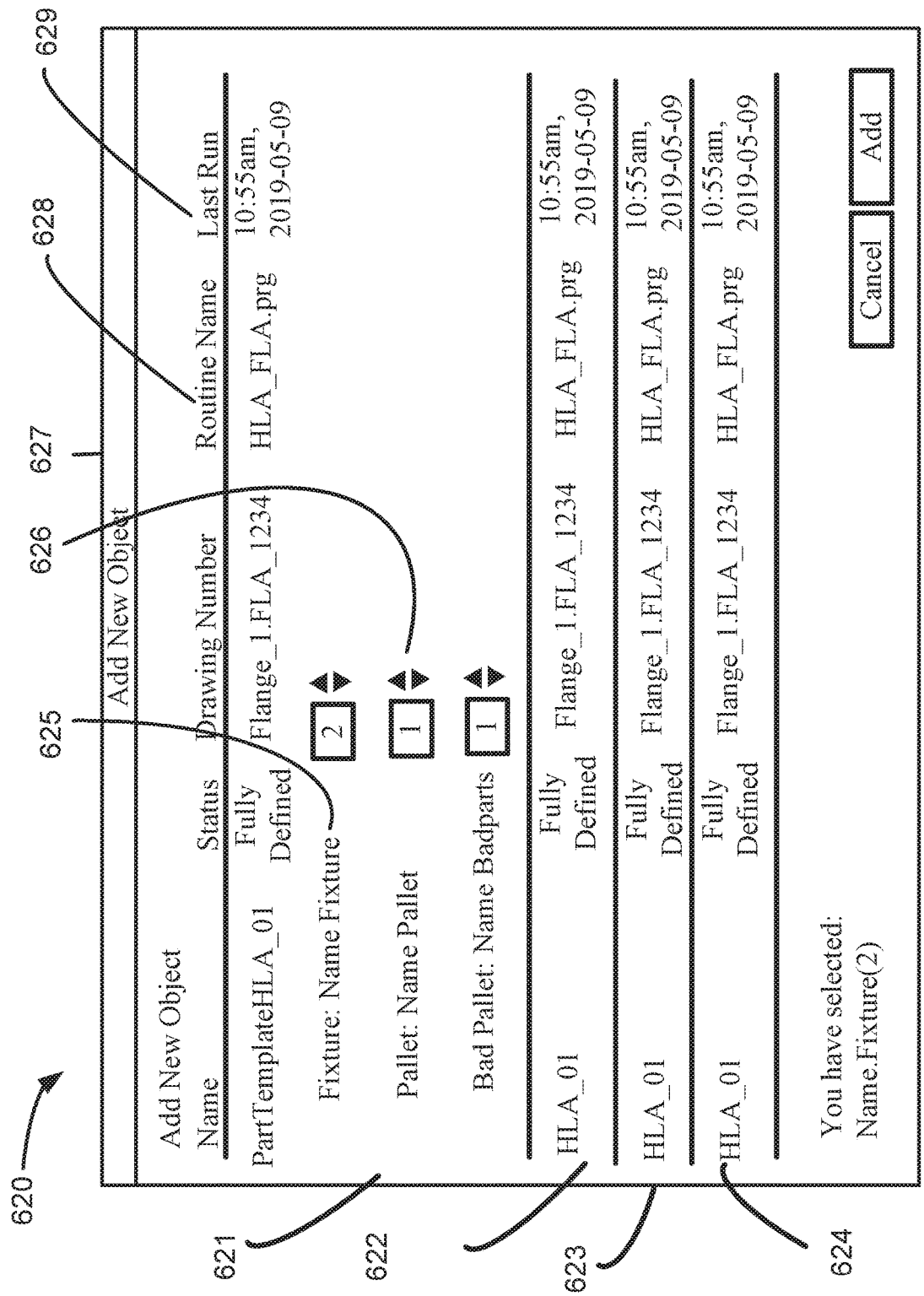
FIG. 6B schematically illustrates an embodiment of a user interface for adding a new object.
Figure 6C:
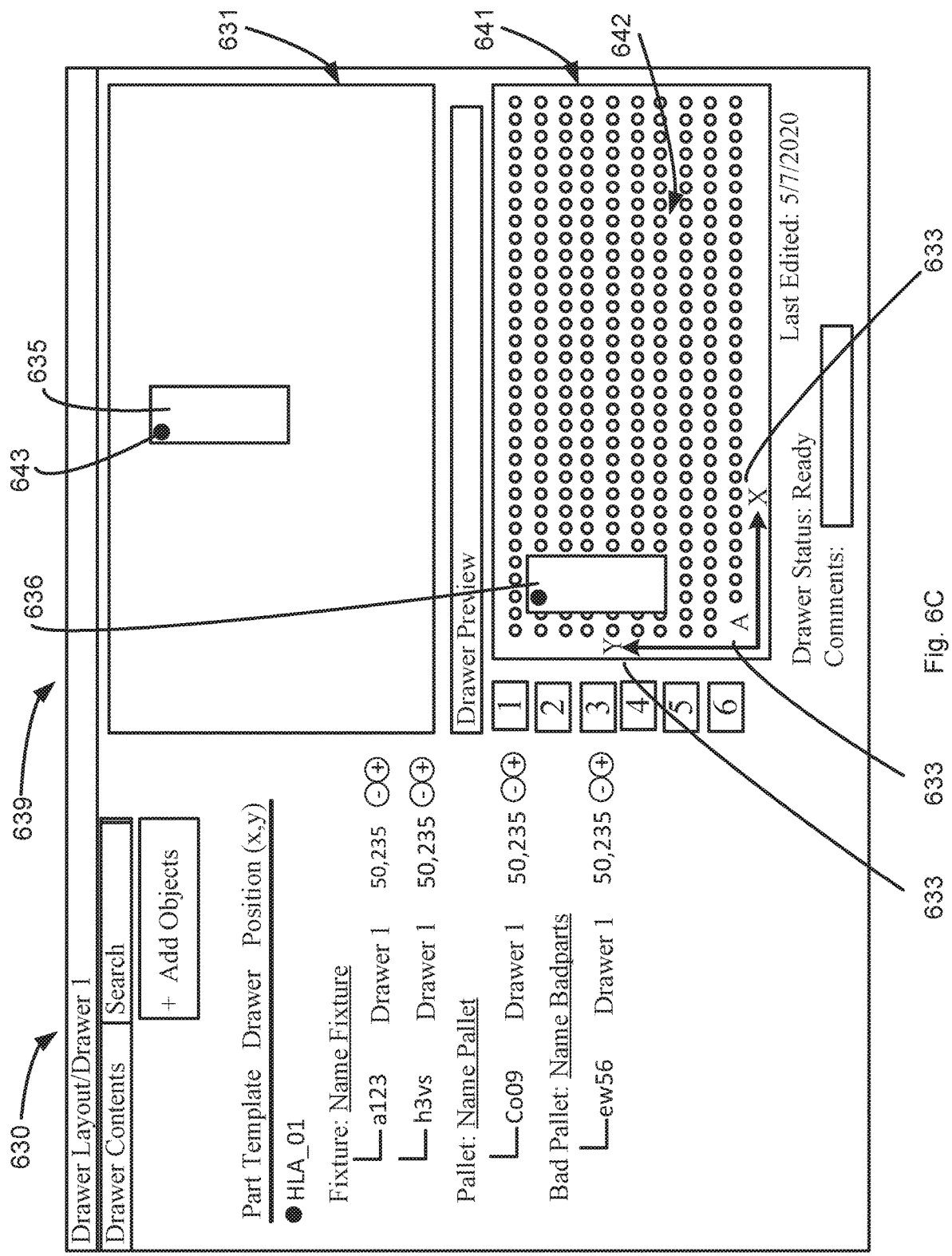
FIG. 6C, FIG. 6D and FIG. 6E schematically illustrates an embodiment of a drawer definition interface.
Figure 6D:
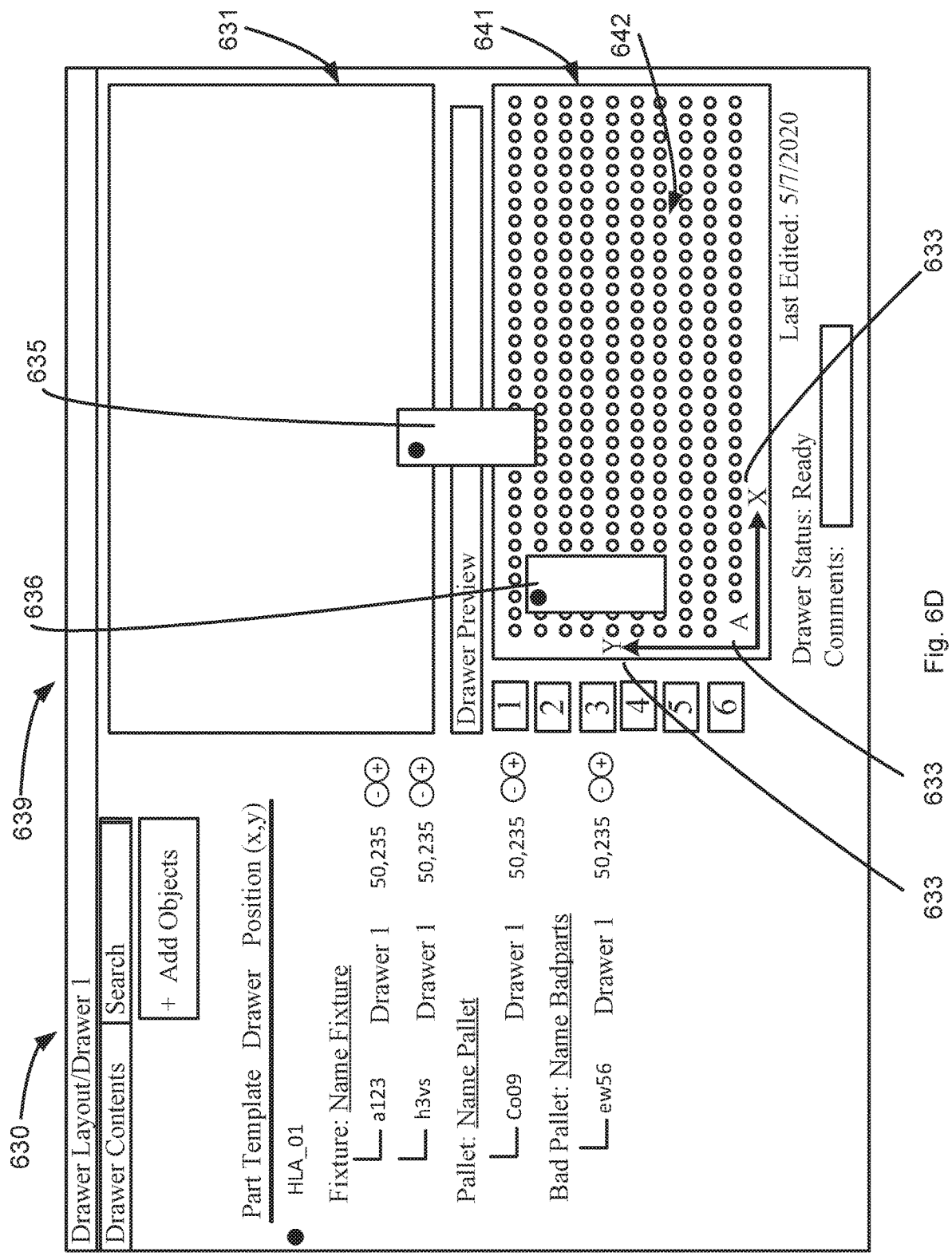
Figure 6E:
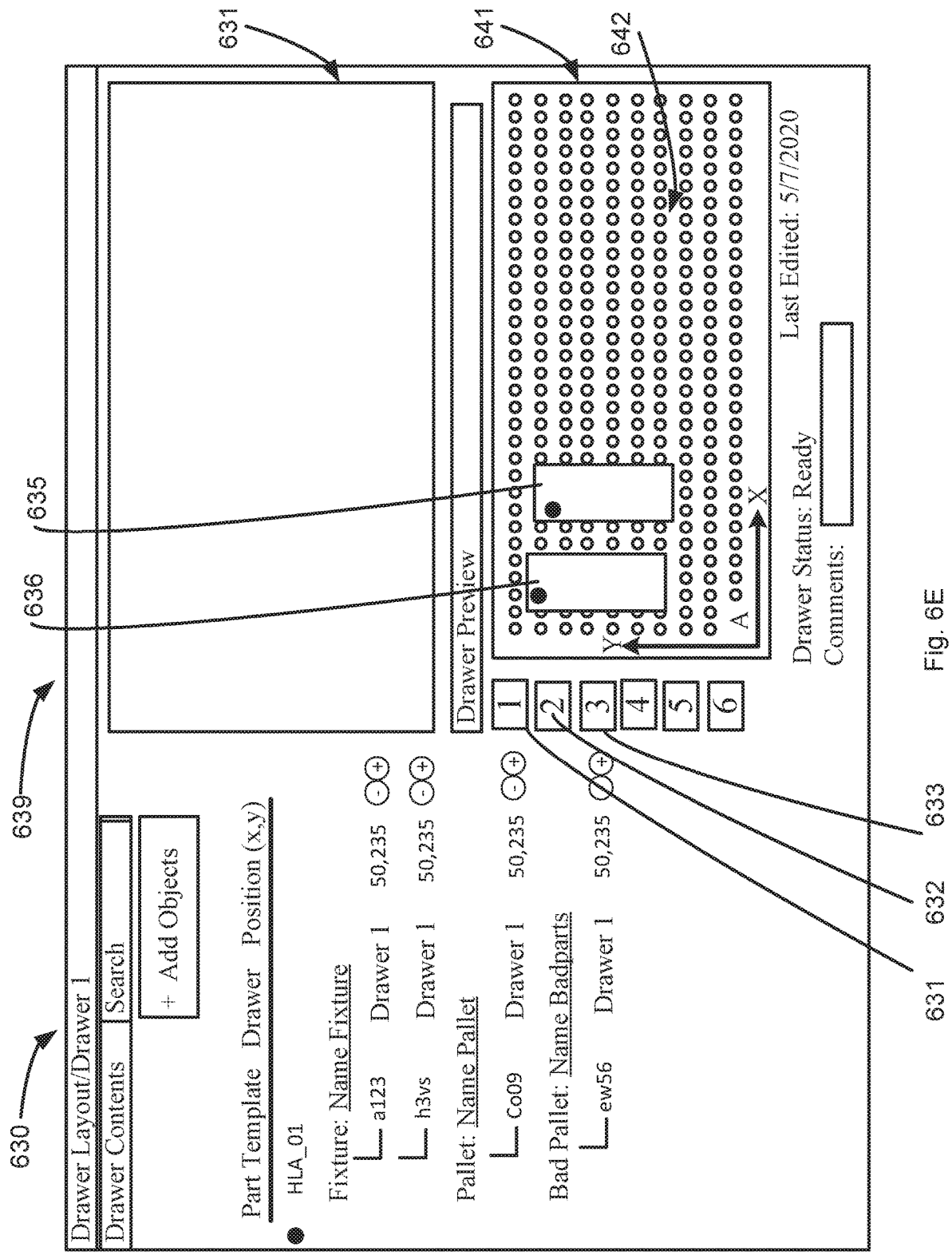

FIG. 6A; FIG. 6B; FIG. 6C; FIG. 6D; and FIG. 6E schematically illustrate embodiments of graphical user interfaces for setting-up a batch process on a batch inspection system 10.

FIG. 6A illustrates an embodiment of a job definition page 600, including tabs 601, 602, 603, 604 and 605 ("01", "02", "03", "04" and "05") to a plurality of additional pages. The tabs 601, 602, 603, 604 and 605 provide to an operator 99 access to various user interfaces to define one or more jobs to be implemented by a batch inspection system 10. For example, using the job definition page 600, an operator 99 is able to input data to author a job 450 from data structures 400, as described in connection with FIG. 4A and FIG. 4B and FIG. 5A, FIG. 5B and FIG. 5C.

Tab 611, which is activated in FIG. 6A, presents fields to allow the operator to define one or more parts to be inspected, such as fields to complete data structure 420 describe herein. In some embodiments, tab 611 opens an "Add New Object" page 620 which provides additional options for the operator to define additional parts. An embodiment of an "Add New Object" page 620 is shown in FIG. 6B, which provides to the operator tabs 621, 622, 623, 624, each to access a corresponding one of a plurality of screens corresponding to a plurality of parts, and allows the operator to identify, for each part, a corresponding fixture 626, pallet 627, location for disposing bad parts (e.g., parts that fail inspection) 628, the drawing number for the part 628, and the routine to be run by an inspection apparatus to execute inspection of the part 629.

Tab 602 opens a job tracking page, such as the job tracking page 650 illustrated in FIG. 7A-FIG. 7E.

Tab 603 presents to the operator 99 fields to allow the operator to define a CMM fixture. Some workpieces 180 are held by a corresponding CMM fixture when being inspected by the coordinate measuring machine 100. Specifying, for each such workpiece 180, the corresponding CMM fixture enables the robot 300 to place the workpiece 180 correctly into the specified CMM fixture.

Tab 604 presents to the operator fields to allow the operator to define a part fixture. Some workpieces 180 are held by a corresponding part fixture (e.g., a workholder) when being stored in a container 201. Specifying, for each such workpiece 180, the corresponding part fixture enables the robot 300 to grasp the workpiece 180 correctly, for example by the part fixture itself.

Tab 605 presents to the operator 99 a graphical user interface 630 to allow the operator 99 to define a container 201 or pallet 240 holding a set of workpieces, for example. An embodiment of such a graphical user interface 630 is schematically illustrated in FIG. 6C, FIG. 6D and FIG. 6E.

The graphical user interface 630 presents among other things a graphical container 641 that represents a corresponding physical container 201 for holding a set of workpieces 180 to be inspected, or for receiving and holding a set of workpieces 180 that have already been inspected, in either case as a storage container 221 for example. The graphical container 641 enables an operator 99 to specify the precise location in the physical container 201 of one or more workpieces 180 to be inspected, and/or the precise location in a physical container 201 for workpieces that have already been inspected. The precisely-specified location in the physical container of each such workpiece 180 enables the robot 300 to locate and grasp each such workpiece 180 for transferring each such workpiece 180 from the physical storage container 201 to the measuring space of a coordinate measuring machine 100, and in some embodiments to transfer that workpiece 180 from the coordinate measuring machine 100 to, or back to, that precisely defined location on the physical storage container 201.

To those ends, in illustrative embodiments, the graphical container 641 is an accurate representation of the surface 202 of the storage plate 203 of the container 201. For example, in some embodiments the graphical container 641 has the same shape as the surface 202 of the container 201. For example, if the surface 202 of the container 201 is rectangular, then the shape of the graphical container 641 is also a rectangle, with the same proportions (e.g., length to width) as the shape of the surface 202 of the container 201.

Also to those ends, some embodiments of the graphical container 641 also include a graphical grid pattern 642 to identify a plurality of specific locations on the graphical container 641, each location corresponding to a specific location the surface 202 of the container 201. Some embodiments also include a set of one or more graphical reference points 643, each reference point 643 having a known position relative to the grid pattern 642, to define the grid relative to the geometry of the container 201. For example, the location of the set of reference points 643, when provided to the robot 300 or control computer 50, enable the robot 300 to determine the location of each point on the grid 643, and therefore to determine the location of each workpiece 180 on the container 201. For example, in FIG. 6C the reference point 643 establishes a two-dimensional (X, Y) coordinate system in the graphical container 641, which two-dimensional coordinate system corresponds to the two-dimensional surface 202 of the container 201. In some embodiments, an operator 99 may correlate each reference point 633 to the coordinate system of a robot 300 by touching a robot's probe 340 to a corresponding physical reference features 233 on a container 201 (see, e.g., FIG. 2B), and clicking on the reference point 633.

Similarly, an operator 99 may correlate each reference point 243 of a pallet 230 to the coordinate system of a robot 300 by touching a robot's probe 340 to a corresponding physical reference features 243 on a pallet 240 and clicking on the reference point 643 on a graphical depiction of that pallet in the graphical user interface.

The graphical user interface 630 also includes a layout area 631 configured to display a set of icons 639 (e.g., icons 635, 636), each icon representing a corresponding workpiece 180. In preferred embodiments, each such icon is to scale relative to the graphical container 641. In other words, each icon 639 has a graphical scale such that the ratio of the size of the icon 639 relative to the size of the graphical container 641 is the same as the ratio of the size of its corresponding workpiece 180 to the size of the physical container 201.

In use, the operator 99 selects an icon 635 from the layout area 631, and drags that icon 635 to the graphical container 641, as illustrated in FIG. 6D. The operator 99 then drops the icon 635 in a desired position on the graphical container 641, as illustrated in FIG. 6E, the position of the dropped icon 635 being precisely defined (e.g., via the grid 642) to match the actual location on the container 201 of the workpiece 180 corresponding to the dropped icon 635.

It should be noted that one or more of the icons 639 (e.g., icons 635, 636) may also represent a pallet 240 holding a plurality of workpieces, and may be selected and moved, as described above, to represent the location of a pallet 240 on a container 201.

Illustrative embodiments of the graphical user interface 630 include a plurality of tabs 631, 631, 633, each of which, when activated by an operator 99, causes the display of a different graphical container 641. In this way, the graphical user interface 630 enables the operator 99 to manage a corresponding plurality of containers 201. Moreover, the operator 99 can define a first container 201, while a coordinate measuring machine 100 is inspecting the workpieces 180 on a second container 201. This promotes and improves efficient and continuous operation of the coordinate measuring machine 100, and a plurality of containers 201.

Figure 7A:
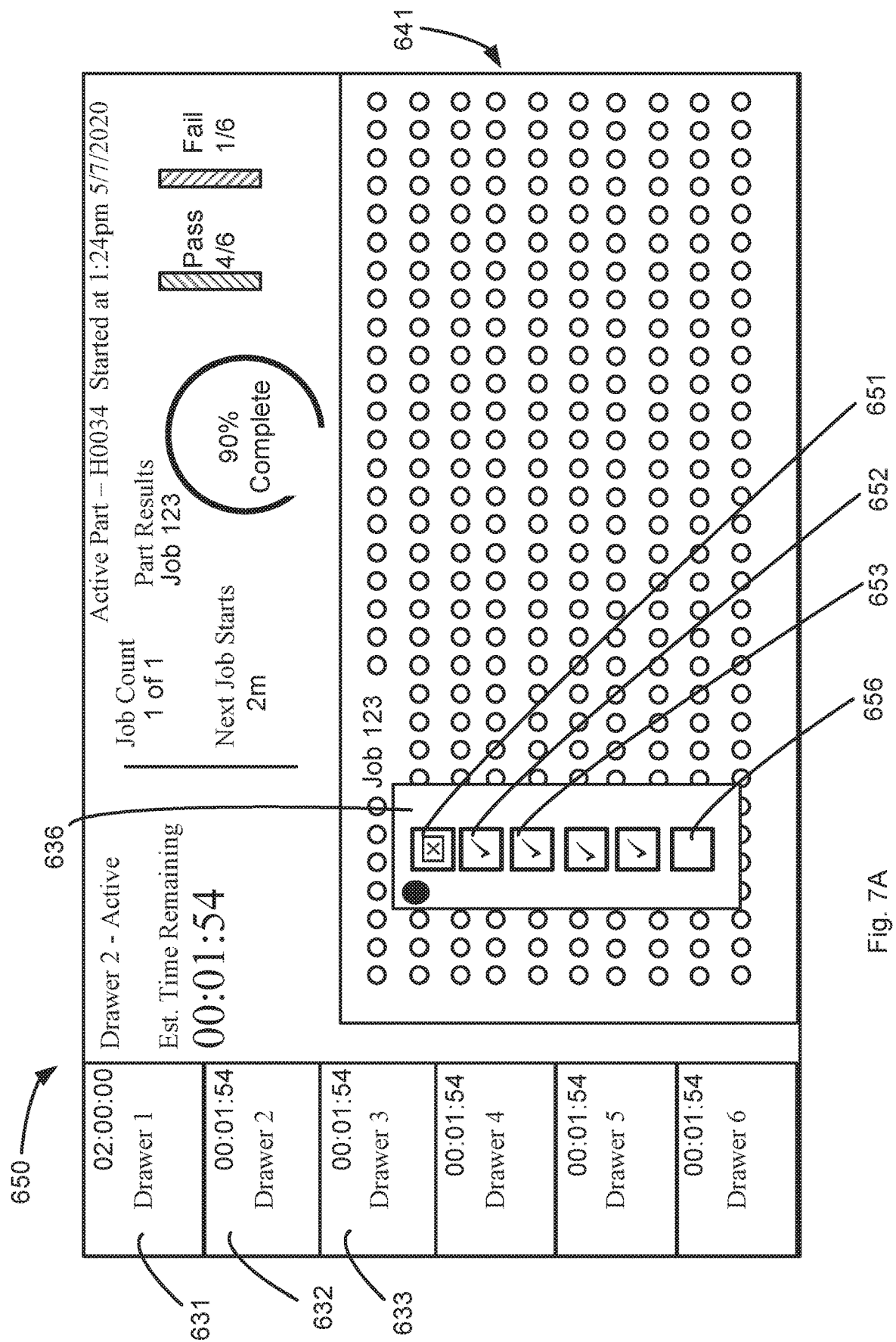
FIG. 7A schematically illustrates an embodiment of a job tracking interface.

FIG. 7A schematically illustrates a job tracking user interface page 650 configured to present to an operator the status of one or more jobs. In this embodiment, the job tracking page 650 of the graphical user interface 630 includes a graphical container 641, and provides a graphical representation of the status of one or more workpieces 180 on a container 201.

For example, FIG. 7A schematically illustrates a graphical container 641 having a pallet 636 in a specific position. The pallet 636 holds a plurality of workpieces, each represented by a status icon 651, 652, 653. In the embodiment of FIG. 7A, the graphical container 641 also graphically displays an empty icon 656 indicating the position on the graphical container 641 of a workpiece 180 presently on the coordinate measuring machine 100, for example. Each status icon 651, 652, 653 indicates the inspection status of its corresponding workpiece 180. For example, status icon 651 includes a graphical element (in this case, an "X") indicating that the corresponding workpiece 180 failed inspection. Status icon 652, in contrast, includes a graphical element (in this case, a check mark) indicating that the corresponding workpiece 180 passed inspection. The status page 650 thereby allows an operator 99 to see, at a glance, not only the inspection status of each workpiece 180, but also of the collection of workpieces 180 on the pallet represented by icon 636.

Figure 7B:
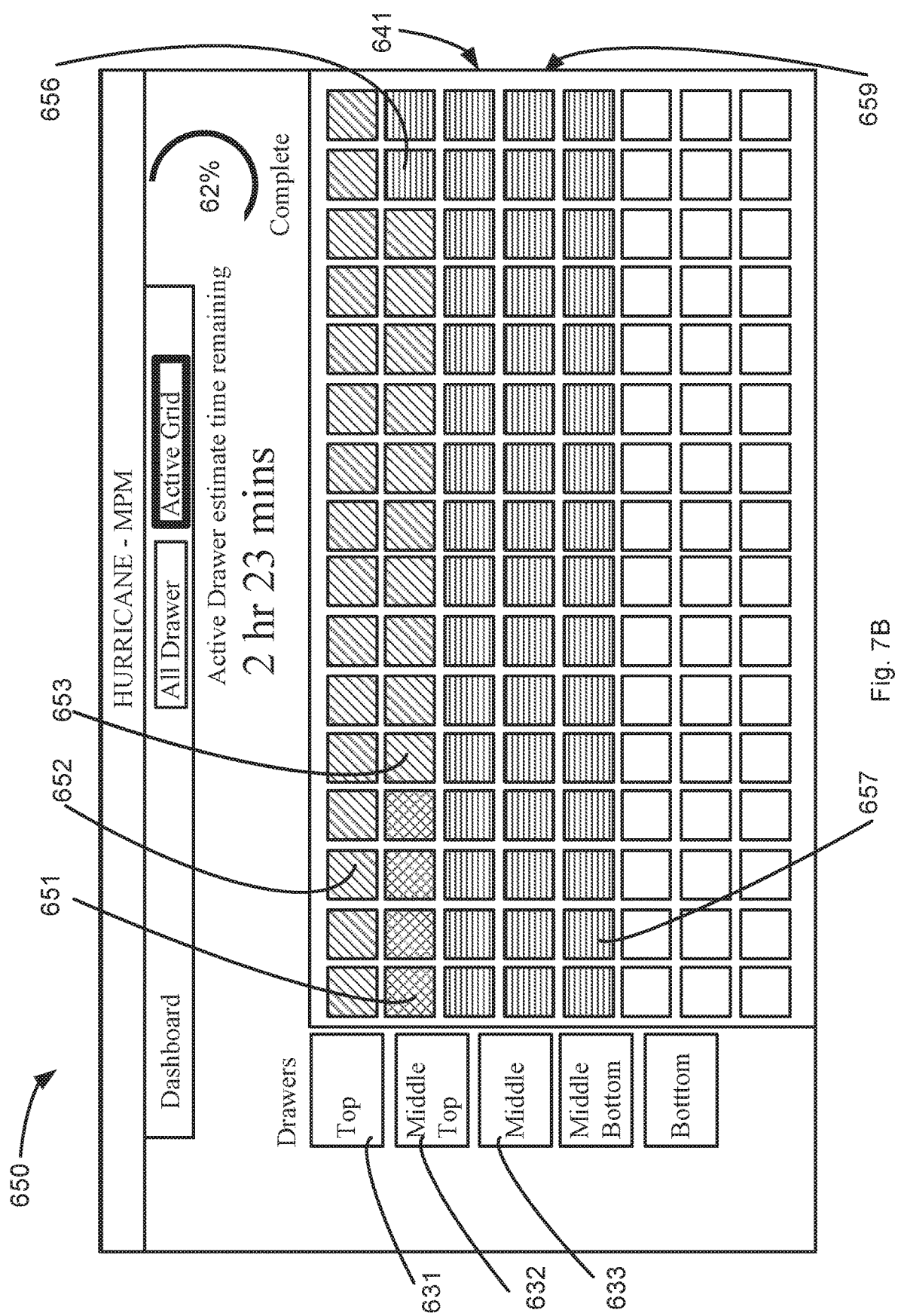
FIG. 7B illustrates an embodiment of a graphical user interface for monitoring and controlling a batch inspection job.

FIG. 7B illustrates an embodiment of a graphical user interface (GUI) 650 embodiment for monitoring and controlling a batch inspection job.

Among other benefits, the graphical user interface 650 provides, to an operator, a quick, easily-understandable status report on the progress of a batch job. In some embodiments, the graphical user interface 650 includes a depiction of the layout of workpieces 180 in a container 201 and the depiction enables contemporaneous monitoring of the inspection process by providing a visual indication of progress of an inspection job being executed.

The GUI 650 shown enables monitoring job progress through a graphical representation 641 of the container 201 (e.g., drawer, shelf or pallet; storage containers 121, 122, 123). The graphical representation 641 includes a plurality of geometric shapes 659 (e.g., shapes 651, 652, 653, shown here as squares), that illustrate the placement of unique parts 180 in a job's part queue. In some instances, the location of the geometric shapes 659 directly corresponds to the part's 180 location in the container 201 as shown by the location of the geometric shape in the graphical representation 641.

Each geometric shape 659 includes one or more indicia of a current status or inspection result of the corresponding part 180 in the job. For example, the indicia could include different colors of those geometric shapes that indicate the status of those unique parts in the following manner: A first (e.g., green) indicia (652, 653) indicates that the corresponding part 180 has completed and passed inspection. A second (e.g., red) indicia (652) indicates that the corresponding part 180 has completed and failed inspection. A border indicia (e.g., a white, or contrast-color border) (656) indicates that the corresponding part 180 is currently being inspected. And, a third (e.g., grey) indicia (657) indicates that the corresponding part 180 is in the queue of the active job to be inspected.

In some embodiments, the locations and indicia of the geometric shapes 659 are updated in real time as their corresponding physical location changes with respect to the graphical representation 641 and/or their indicia changes as the job progresses. In some instances, a user can interact with one or more geometric shapes (e.g., 651, 652, 653) in the GUI 650 in order to retrieve additional properties regarding the corresponding part 110 and/or the progress and/or result of the present job (e.g., the result of the inspection using the CMM 100, including any associated parameters related to conducting and qualifying the inspection). For example, an operator 99 may click-on a geometric shape (e.g., 651, 652, 653) in the GUI 650, and in response the system will display information about the inspection of the workpiece 180 corresponding to that geometric shape.

In some embodiments, the graphical user interface 650 is configured to enable an operator 99 to operate a batch inspection system 10 having a coordinate measuring machine 100 having a measuring space 113, a robot 300 disposed to deliver each of plurality of workpieces to the measuring space 113, and a control computer 50 having a display device 54 and operably coupled to the coordinate measuring machine 100 and the robot 300.

Figure 7C:
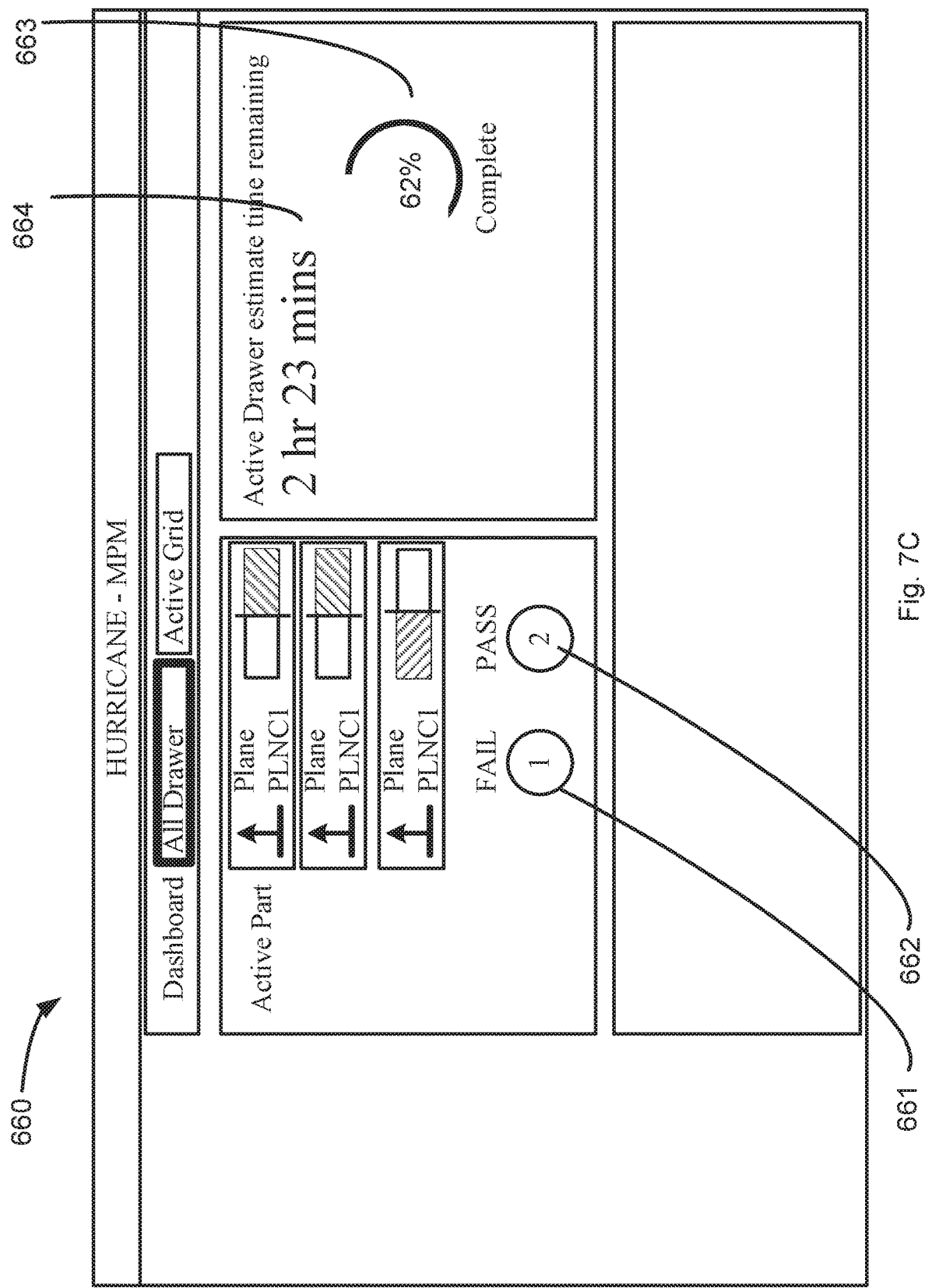
FIG. 7C illustrates an embodiment of a user interface 660 graphically provides to an operator information conveying the status of a batch job.

FIG. 7C illustrates an embodiment of a user interface 660 that graphically provides to an operator 99 information conveying the status of a batch job executing on an inspection system 10, including an icon 661 reporting the number of workpieces 180 that have failed inspection, and an icon 662 reporting the number of workpieces 180 that have passed inspection. An icon 663 reports the percentage of the batch inspection job completed, and a display 664 estimating the time remaining gin the batch inspection job, and/or for a container 201 holding a set of workpieces 180 being inspected.

Figure 7D:
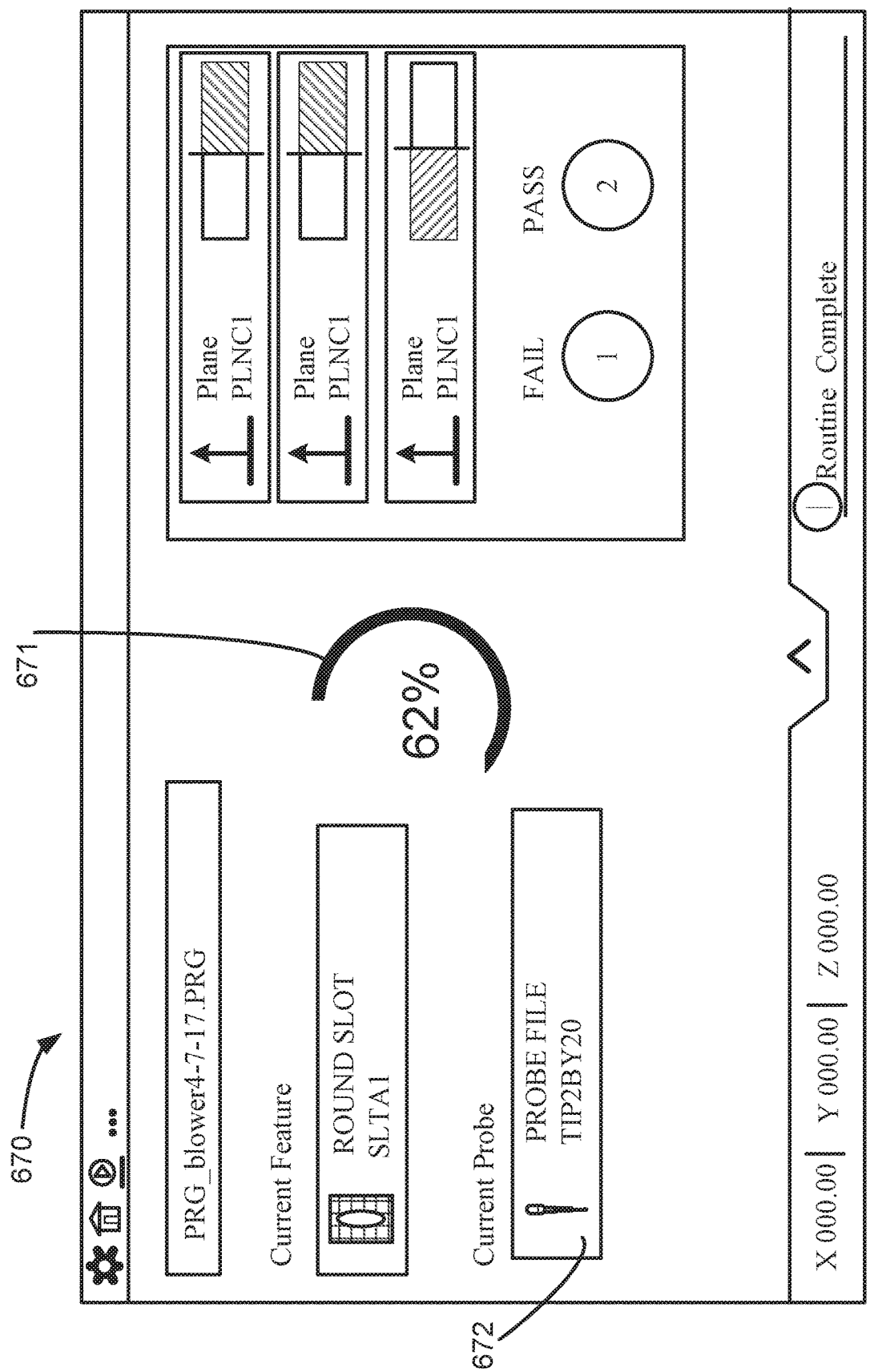
FIG. 7D illustrates an embodiment of a user interface that graphically provides to an operator information conveying the status of a coordinate measuring machine.

FIG. 7D illustrates an embodiment of a user interface 670 that graphically provides to an operator 99 information conveying the status of a coordinate measuring machine 100 participating in execution of a batch inspection job. Icon 671 indicates the time remaining for the inspection of the workpiece 180 presently being inspected. Icon 672 indicates the probe 140 presently being used by the coordinate measuring machine 100.

Operation

Figure 8A:
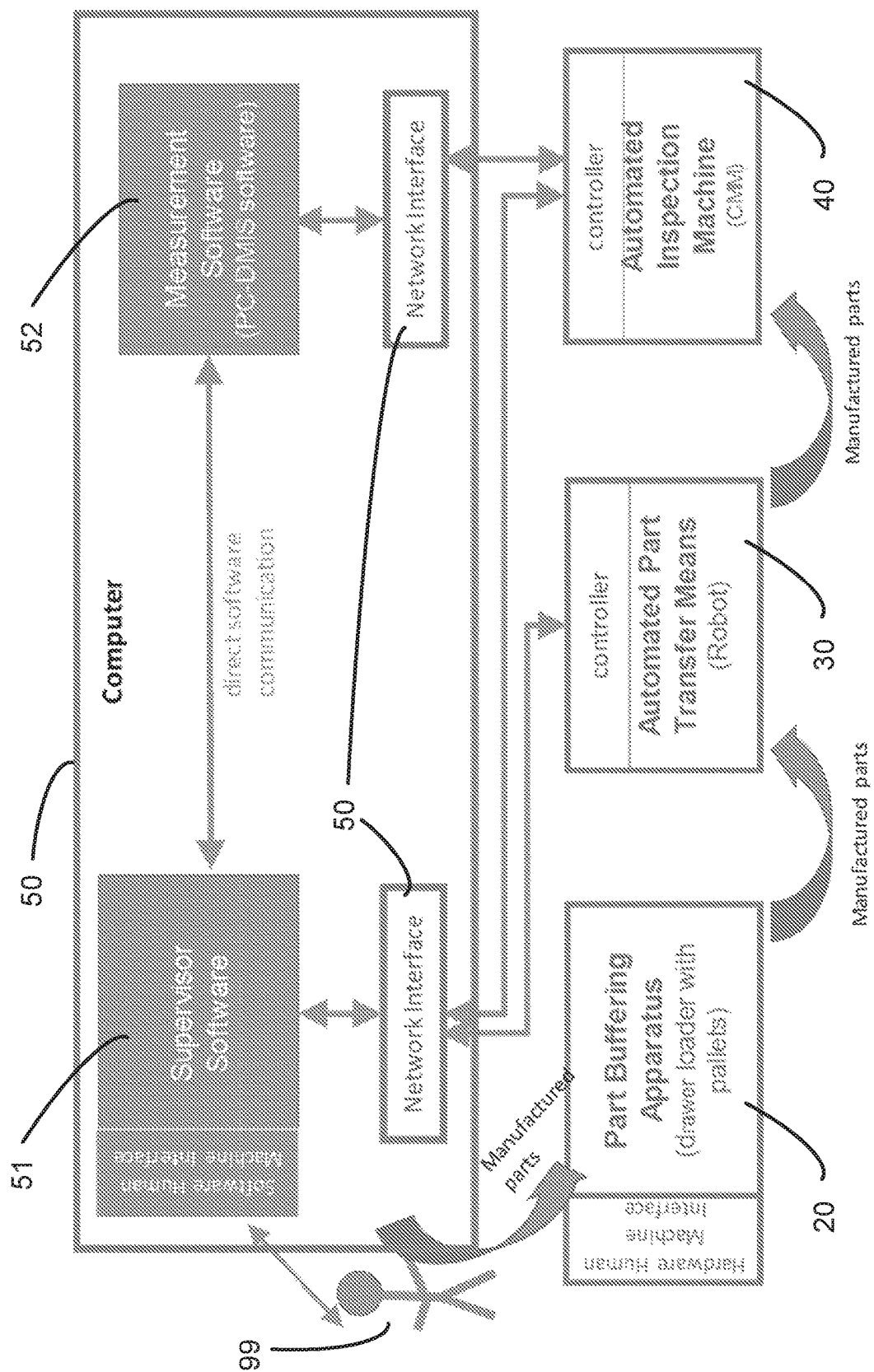
FIG. 8A schematically illustrates workflow in an embodiment of a system.

FIG. 8A schematically shows a system 10 configured in accordance with illustrative embodiments of the invention. As shown, a computer 50 contains supervisor software 51 and measurement software 52 (e.g., controlling the CMM) that communicate with various other system components. Specifically, those other system components include a part buffering apparatus 20, such as a drawer loader with pallets, an automated part transferring device 30, such as a robot, and an automated inspection machine 40, such as a CMM 100. FIG. 8A shows how the operator 99 interfaces with the system 10, as well as the manufactured part flow from the buffering apparatus 20 to the inspection machine 40.

Figure 8B:
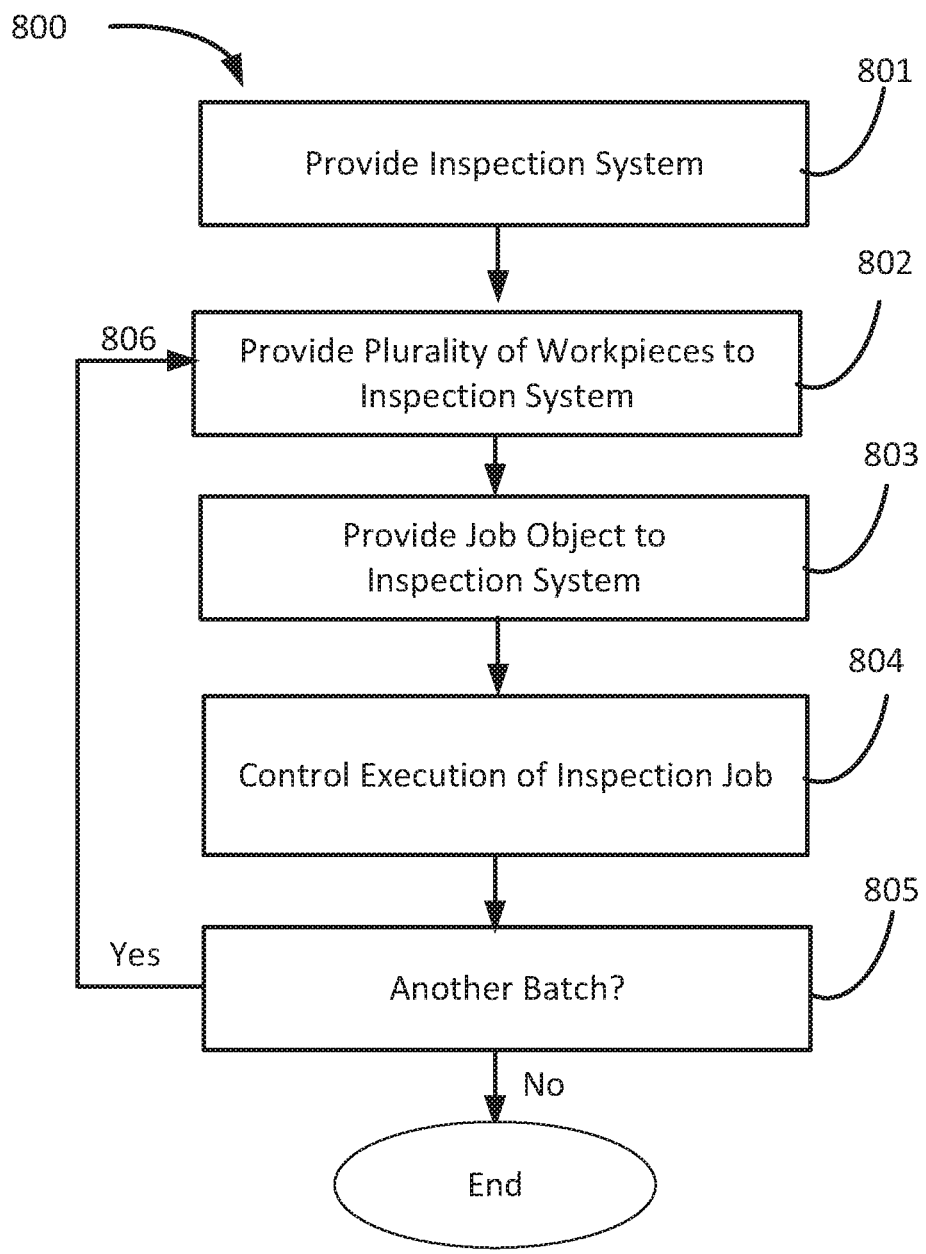
FIG. 8B is a flowchart illustrating an embodiment of a method of operation of an inspection system.

FIG. 8B is a flowchart illustrating an embodiment of a method 800 of operation of an inspection system 10.

Step 801 includes providing an inspection system 10 including at least a buffering apparatus 20, a workpiece handling apparatus 30 (e.g., robot 300), and a workpiece inspection instrument 40. In illustrative embodiments, providing an inspection system 10 includes providing the buffering apparatus 200, robot 300, and a coordinate measuring machine 100 oriented to one another such that the robot can retrieve a workpiece 180 from the buffering apparatus 200 and place that workpiece 180 into the measuring space of the coordinate measuring machine 100 for inspection by the coordinate measuring machine 100.

Step 802 includes providing to the inspection system 10 a plurality of workpieces 180 to be inspected by a batch inspection job. The plurality of workpiece may be referred-to as a "batch." The batch of workpieces may be provided, for example, in a container 201, or on a pallet.

Step 803 includes at least providing a job object (e.g., a job data object assembly 550) to the inspection system 10. The job object provides, to the inspection system 10, information that enables execution of an inspection job, such as a batch inspection job tailored to a specific batch of workpieces. Unlike a measuring routine for a coordinate measuring machine 100 or a program for a robot 300, the job object is used to configure and coordinate the activities of multiple apparatuses in an inspection system, so that those multiple apparatuses work together to sequentially inspect each workpiece 180 of a plurality of workpieces. Some embodiments of the job object coordinate the operation of a robot 300 with the operation of a coordinate measuring machine 100 to sequentially inspect a plurality of objects when those objects are identical to one another, and when those objects are not nominally identical to one another such that the actions of the robot 300 or the coordinate measuring machine, or both, change from object to object. To those ends, the job object may include some or all of the information described above in connection with FIG. 4A, FIG. 4B, FIG. 5A and FIG. 5B.

In an illustrative embodiment, the job object includes storage location information defining the location of a set of workpieces 180 in the storage apparatus 200 so that the robot 300 using that location information is able to retrieve each workpiece 180 in the batch of workpieces 180 from the storage apparatus 200.

The job object in the illustrative embodiment may also include CMM location information defining the location of the measuring space of the coordinate measuring machine 100 so that the robot 300 using the CMM location information is able to place (and/or retrieve) each workpiece 180 to (and/or from) the measuring space of the coordinate measuring machine 100.

The job object in the illustrative embodiment may also include information identifying, for each workpiece 180 in the set of workpieces 180, the routine to be executed by the coordinate measuring machine to measure or inspect each such workpiece 180.

It should be noted that each workpiece 180 in the set of workpieces may be different from one or more other workpieces 180 in the batch of workpieces (e.g., workpieces that are not nominally identical to other workpieces 180, such as workpieces of a different design; a different species of workpiece). Consequently, the routine provided for each successive workpiece 180 may be different than (i.e., distinct from) the routine provided for the workpiece 180 that precedes a given workpiece 180 to the coordinate measuring machine 100, and the workpiece 180 that follows the given workpiece 180 to the coordinate measuring machine. Consequently, the job object may identify a plurality of routines, each designated for a corresponding one of the workpieces 180 in the set of workpieces.

In some embodiments, providing a job object at step 803 includes generating the job object, for example by providing the content of that job object as described above, such as by using a user interface for example. In some embodiments, providing a job object at step 803 includes retrieving a pre-defined job object from memory 52 of the control computer 50, or from the database 13.

Step 804 includes controlling the execution of an inspection job by the system 10. Control may include actions such as scheduling execution of a batch inspection job; initiating execution of a batch inspection job; pausing the execution of a batch inspection job; changing the priority of a batch inspection job; and terminating a batch inspection job, to name but a few examples. Controlling execution of a job may also include monitoring the progress of the job, and/or the results of inspections, through a graphical user interface. Such control may be provided by an operator 99 through the computer 50.

Step 805 determines whether there is an additional batch job to execute. If so, step 806 of the method 800 loops back to step 802, and if not the method 800 ends.

Figure 8C:
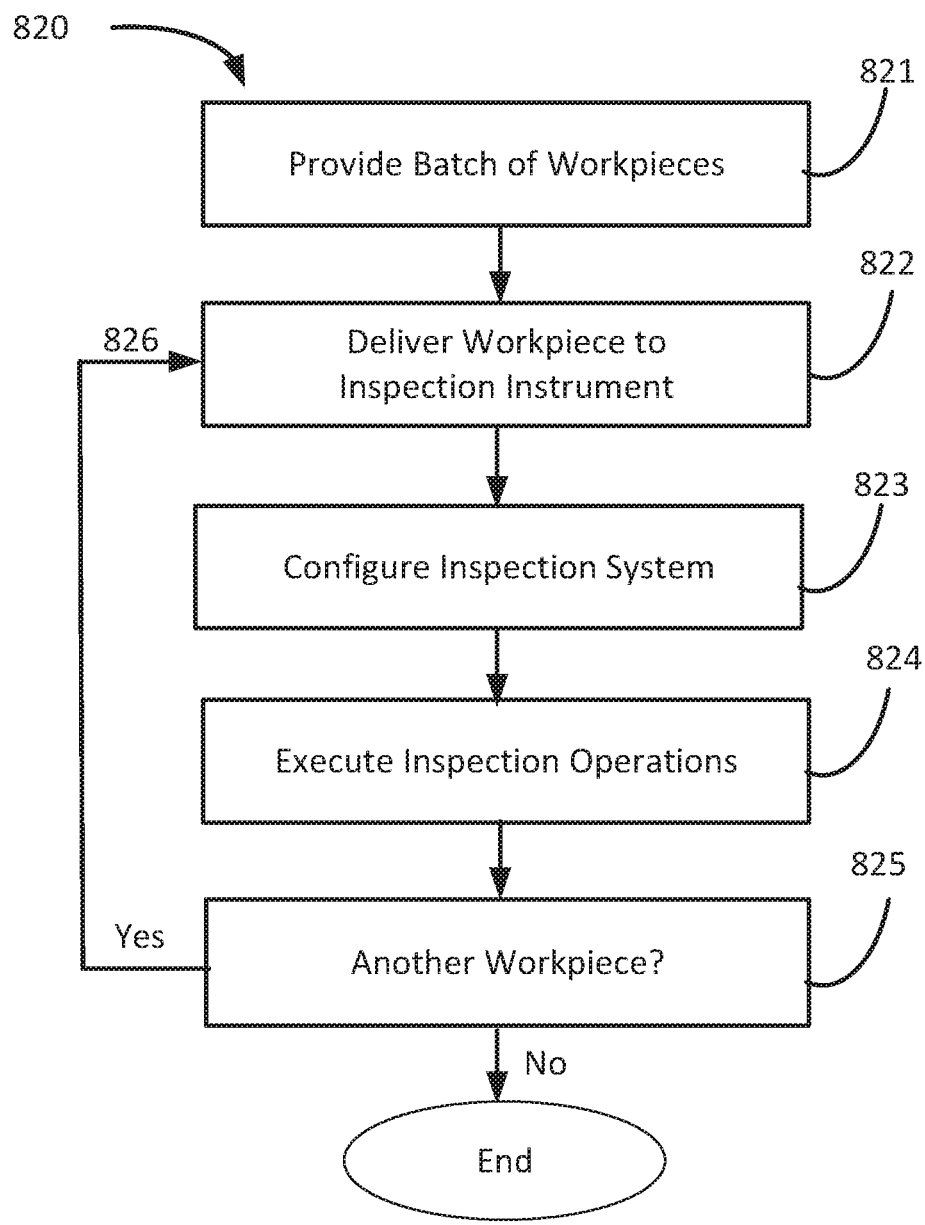
FIG. 8C is a flowchart of an embodiment of a method of batch inspection of a batch of a plurality of workpieces.

FIG. 8C is a flowchart of an embodiment of a method 820 of batch inspection of a batch of a plurality of workpieces 180.

Step 821 includes providing a batch of a plurality of workpieces 180. In some embodiments, the batch of workpieces 180 includes a first workpiece 180, the first workpiece requiring a first set of inspection operations by the inspection system, and a second workpiece requiring a second set of inspection operations by the inspection system, where the second workpiece not identical to the first workpiece, and the second set of operations is not identical to the first set of operations.

Step 822 includes delivering a workpiece 180 to the measuring instrument (e.g., coordinate measuring machine 100).

Step 823 includes configuring the inspection system 10 for the specific workpieces 180 of the batch of workpieces provided at step 821. When the batch of workpieces includes non-identical first and second workpieces step 823 includes, for the first workpiece 180, instantiating an instance of a first set of inspection operations (the first instance).

The inspection operations of the first instance may also include, for example, providing to the robot 300 the identity of the container 201 in which the first workpiece 180 is stored, and the location of the first workpiece 180 in that identified container, so that the robot can automatically retrieve the first workpiece from the container 201 and provide that first workpiece to the measuring space of the coordinate measuring machine. To that end, the location of the first workpiece 180 in the container 201 may be a specific location on a surface 202 of that container 201, or specific location on a specified pallet 240 in the container 201.

The inspection operations may include, for example, a set of operations for measuring physical dimensions of the workpiece 180 (e.g., the first or second workpiece 180), and/or a set of operations for measuring surface roughness of such a workpiece 180.

Configuring the inspection system 10 may also include automatically obtaining a probe 140 for use by a coordinate measuring machine 100. For example, inspection operations for a first workpiece 180 may be specified as being performed by a first probe 140, and inspection operations for a second workpiece 180 may be specified as being performed by a second probe 140, the second probe distinct from the first probe. For example, in some embodiments in which the inspection instrument includes a coordinate measuring machine 100, the second set of inspection operations for inspecting a second workpiece after inspecting a first workpiece 180 with a first probe, includes automatically obtaining a second, different probe 140 (e.g., from a probe rack 115) by the coordinate measuring machine 100.

Some embodiments also include providing a database 13 storing a plurality of job objects, each job object of the plurality of job objects including the first set of inspection operations and a second set of inspection operations, and step 822 includes obtaining from the database 13 a job object having inspection operations specific to the workpieces of the batch.

Step 824 then executes the inspection operations of the first instance to inspect the first workpiece.

Step 825 determines whether there is another workpiece 180 (e.g., a second workpiece 180) from the batch of workpieces, which second workpiece has yet to be inspected by the coordinate measuring machine 100. If so, the step 825 loops back to step 822 to configure to the inspection system to inspect that second workpiece 180. If the second workpiece 180 is identical to the first workpiece, then the inspection routine for the first workpiece 180 may be retained and used again, but other configuration details may be updated, such as the location of the second workpiece in the container 201.

If the second workpiece 180 is not identical to the first workpiece, then the step of configuring the inspection system for the second workpiece includes providing a second set of inspection operations (a "second instance"), specified to that second workpiece.

In preferred embodiments, the method 820 includes contemporaneously and automatically providing the second workpiece 180 to the coordinate measuring machine 100, without providing an intervening workpiece to the coordinate measuring machine 100 after the first workpiece 180, and executing the second set of inspection operations on the second workpiece 180 according to the second instance.

When there are no additional workpieces 180 in the batch, the method 820 terminates.

Figure 8D:
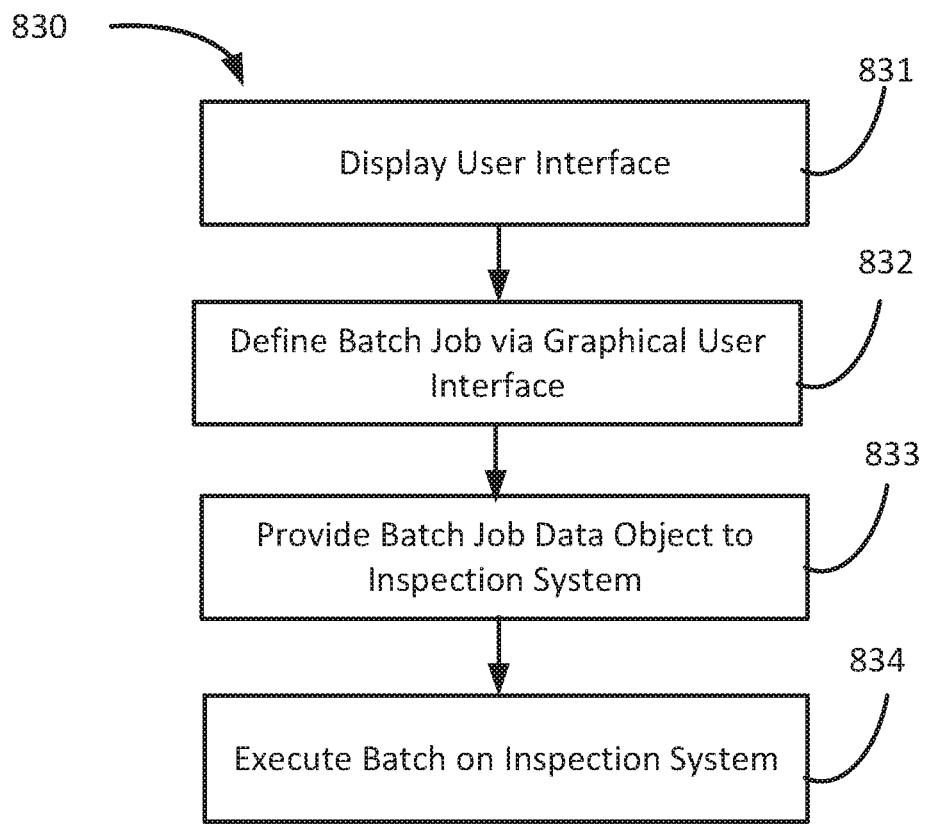
FIG. 8D is a flowchart of an embodiment of a method of configuring a batch inspection system.

FIG. 8D is a flowchart of an embodiment of a method 830 of configuring a batch inspection system having an inspection apparatus (e.g., a coordinate measuring machine 100), a buffering apparatus (e.g., storage apparatus 200), and a controller 50 having a display device 54.

Step 831 includes displaying, on the display device 54, a user interface 620 configured to receive, from an operator 99, information defining a batch inspection job. Illustrative embodiments of the user interface 620 include a graphical user interface 630 having a layout manager having a graphical container 641, the graphical container representing a corresponding physical container 201, and in some embodiments having a grid pattern of precise grid locations to precisely represent corresponding locations within the corresponding physical container; and a layout area 631 displaying a set of icons, each icon in the set of icons graphically representing one of (a) a workpiece to be inspected by the batch inspection system, or (b) a pallet holding a set of workpieces to be inspected by the batch inspection system.

In some embodiments, displaying the user interface at step 831 includes displaying, on the display device, a set of data input fields, each data input field in the set of data input fields configured to receive specification of a respective job datum. In such embodiments, the set of data input fields include at least one or more of an operator name; a set of part serial numbers, each part serial number in the set of part serial numbers corresponding, respectively, to a respective workpiece of the plurality of workpieces; a set of part weights, each part weight in the set of part weights corresponding, respectively, to a respective workpiece of the plurality of workpieces; a set of gripper widths, each gripper width in the set of gripper widths corresponding, respectively, to a respective workpiece of the plurality of workpieces; and a specification of a part container, the specification comprising at least one of a grid size or a number of cells, and a reference system for the container.

Such embodiments also display, on the display device, a part program input field to receive from the operator, and store in the batch job data object, specification of a set of part programs, each part program in the set of part programs corresponding to a respective workpiece from the plurality of workpieces. Such embodiments also include receiving, via the part program input field, specification of a set of part programs, and storing said specification in the batch job data object.

Step 832 includes defining a batch job by receiving, from the operator, information via the user interface 620. In illustrative embodiments, defining the batch job includes receiving, via the graphical user interface 630 placement input to select each icon 635, 636 of the set of icons from the layout area 631 and place each such icon 635, 636 into a respective precise grid location of the graphical container 641, said respective precise grid location representing a physical location of its corresponding workpiece 180 or fixture (e.g., pallet) in the buffering apparatus 20.

Step 833 includes providing the batch job (e.g., a batch job data object) to the inspection system 10 for execution by the inspection system 10.

Step 834 includes causing the inspection system 10 to execute the batch job to inspect each workpiece 180 of a plurality of workpieces according to the batch job data object.

Figure 9:
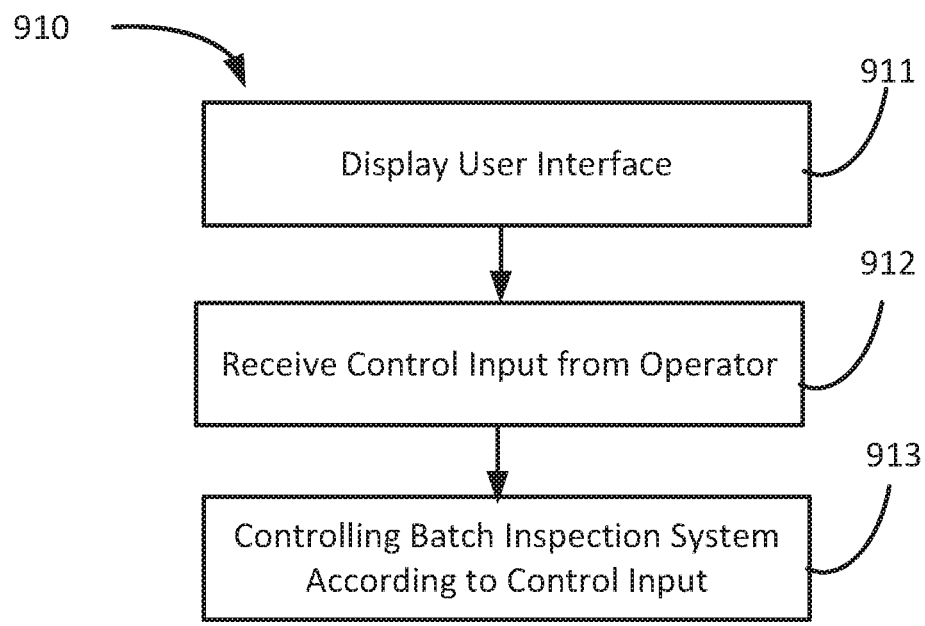
FIG. 9 is a flowchart of an embodiment of a method of monitoring and operating a batch inspection system.

FIG. 9 is a flowchart of an embodiment of a method 910 of operating a batch inspection system 10. The method 910 includes, at step 911, displaying on the display device 54 a graphical user interface 650 configured to allow an operator 99 to monitor and control execution of a batch inspection job by the batch inspection system 10.

The graphical user interface 650 includes a graphical container 641 graphically representing a corresponding physical container 201, the physical container 201 having a plurality of workpieces, each workpiece 180 in the plurality of workpieces having a corresponding unique position in the container 201.

The graphical user interface 650 also includes a plurality of graphical icons, each graphical icon of the plurality of graphical icons corresponding to a unique workpiece from among a plurality of workpieces in a batch job, and displayed in the graphical container in a graphical position corresponding to the position on the physical container of the workpiece.

In some embodiments, the plurality of graphical icons are arranged in a matrix within the graphical container, each graphical icon indicating the position of its corresponding workpiece within the graphical container relative to each of the other graphical icons in the plurality of graphical icons.

Each such graphical icon has (a) a geometric shape; and (b) a set of indicia conveying a status of inspection of the corresponding workpiece. In some embodiments, the set of indicia comprises at least one of the following: a graphical indicium indicating that the corresponding workpiece has completed inspection; a graphical indicium indicating that the corresponding workpiece has completed and passed inspection; a graphical indicium indicating that the corresponding workpiece has failed inspection; a graphical indicium indicating that the corresponding workpiece is currently being inspected; and a graphical indicium indicating that the corresponding workpiece in the queue of the active batch inspection process to be inspected.

Step 912 includes receiving, via the graphical user interface 650, control input from the operator 99; and step 913 includes controlling, by a controller computer 50, operation of the batch inspection system 10 to inspect each workpiece of the plurality of workpieces according to the control input.

In some embodiments, the control input includes one or more of: input defining a schedule for a batch inspection process; input commencing execution of a batch inspection process; input pausing execution of batch inspection process; input modifying the execution of an ongoing batch inspection process; and input changing the priority of a batch inspection process relative to another batch inspection process. In some embodiments, the control input includes commanding a re-inspection of a workpiece corresponding to a one of the graphical icons. In some embodiments, the control input includes changing an inspection routine of a workpiece corresponding to a one of the graphical icons. In some embodiments, the control input includes scheduling a queue of those inspection jobs for execution.

In some embodiments, each geometric icon is configured to receive a request from the operator, and to display in response to said request, at least one of: information regarding part properties of the corresponding workpiece; trace field information of the corresponding workpiece; progress information of the progress of the corresponding workpiece through the inspection process; and result information of the inspection of the corresponding workpiece.

An embodiment of a batch inspection system for inspecting a plurality of workpieces 180, in a batch of workpieces from a physical container 201, includes a coordinate measuring machine 100 having a measuring space 113; a robot 300 disposed to deliver each of plurality of workpieces to the measuring space 113; and a control computer 50 having a display device 54 and operably coupled to the coordinate measuring machine 100 and the robot 300. The control computer 50 is configured to display on the display device 54 a graphical user interface, which graphical user interface includes a graphical container 641 graphically representing the corresponding physical container 201, and a plurality of graphical icons, each graphical icon of the plurality of graphical icons 659 representing a unique corresponding workpiece from among a plurality of workpieces in a batch job, and displayed on the graphical container 642 in a position corresponding to a corresponding position on the physical container 201 of the workpiece 180 corresponding to said icon. In some embodiments, the control computer is further configured to display the plurality of graphical icons arranged in a matrix within the graphical container, each graphical icon indicating the position of its corresponding workpiece within the graphical container relative to each of the other graphical icons in the plurality of graphical icons. Each graphical icon has (a) a geometric shape; and (b) a set of indicia conveying a status of inspection of the corresponding workpiece.

The graphical user interface 650 is further configured to receive control input from the operator; and the control computer 50 is further configured to control the robot 300 and the coordinate measuring machine 100 to inspect each workpiece 180 of the plurality of workpieces according to the control input.

In some embodiments, the control computer further configured to perform at least one of the following in response to operator input received via the graphical user interface: schedule a batch inspection job in response to operator input received defining a schedule for said batch inspection job; commence execution of a batch inspection job in response to input commencing execution of a batch inspection job; pause execution of a batch inspection job in response to input to pause said execution; modify execution of a batch inspection job in response to input modifying the execution of an ongoing batch inspection job; and changing priority of a batch inspection job in response to input changing the priority of a batch inspection job relative to another batch inspection jobs.

In some embodiments, the control computer further configured to re-inspect a specific workpiece in response to control input received from the operator via the graphical user interface, which control input identifies the specific workpiece and directs re-inspection of the specified workpiece.

In some embodiments, the control computer further configured to replace an inspection routine associated with a workpiece in response to control input directing such replacement.

Another embodiment, a non-transitory computer-readable medium has stored thereon sequences of instructions which, when executed by at least one processor, cause the at least one processor to display on a display screen a graphical user interface configured to allow an operator to control execution of a batch inspection job by a batch inspection system. The graphical user interface includes a graphical container 641 graphically representing a corresponding physical container 201, and a plurality of graphical icons, each graphical icon of the plurality of graphical icons representing a unique corresponding workpiece from among a plurality of workpieces in a batch job, and displayed on the graphical container in a position corresponding to a corresponding position on the physical container of the workpiece corresponding to said icon. In some embodiments, the plurality of graphical icons are arranged in a matrix within the graphical container, each graphical icon indicating the position of its corresponding workpiece within the graphical container relative to each of the other graphical icons in the plurality of graphical icons. Each such graphical icon has (a) a geometric shape; and (b) a set of indicia conveying a status of inspection of the corresponding workpiece. The instructions further cause the at least one processor to receive via the graphical user interface control input from the operator; and control a coordinate measuring machine and a robot to inspect each workpiece of a plurality of workpieces according to the control input.

In some embodiments, the control input includes one of input defining a schedule for a batch inspection process; input commencing execution of a batch inspection process; input pausing execution of batch inspection process; input modifying the execution of an ongoing batch inspection process; and input changing the priority of a batch inspection process relative to another batch inspection process.

In some embodiments, the instructions, when executed by at least one processor, cause the at least one processor to control a coordinate measuring machine and a robot to re-inspect a specified workpiece corresponding to a one of the graphical icons.

In some embodiments, the instructions, when executed by at least one processor, cause the at least one processor to change an inspection routine of a workpiece corresponding to a one of the graphical icons.

In some embodiments, the instructions, when executed by at least one processor, cause the at least one processor to schedule queue of those inspection jobs for execution.

Figure 7E:
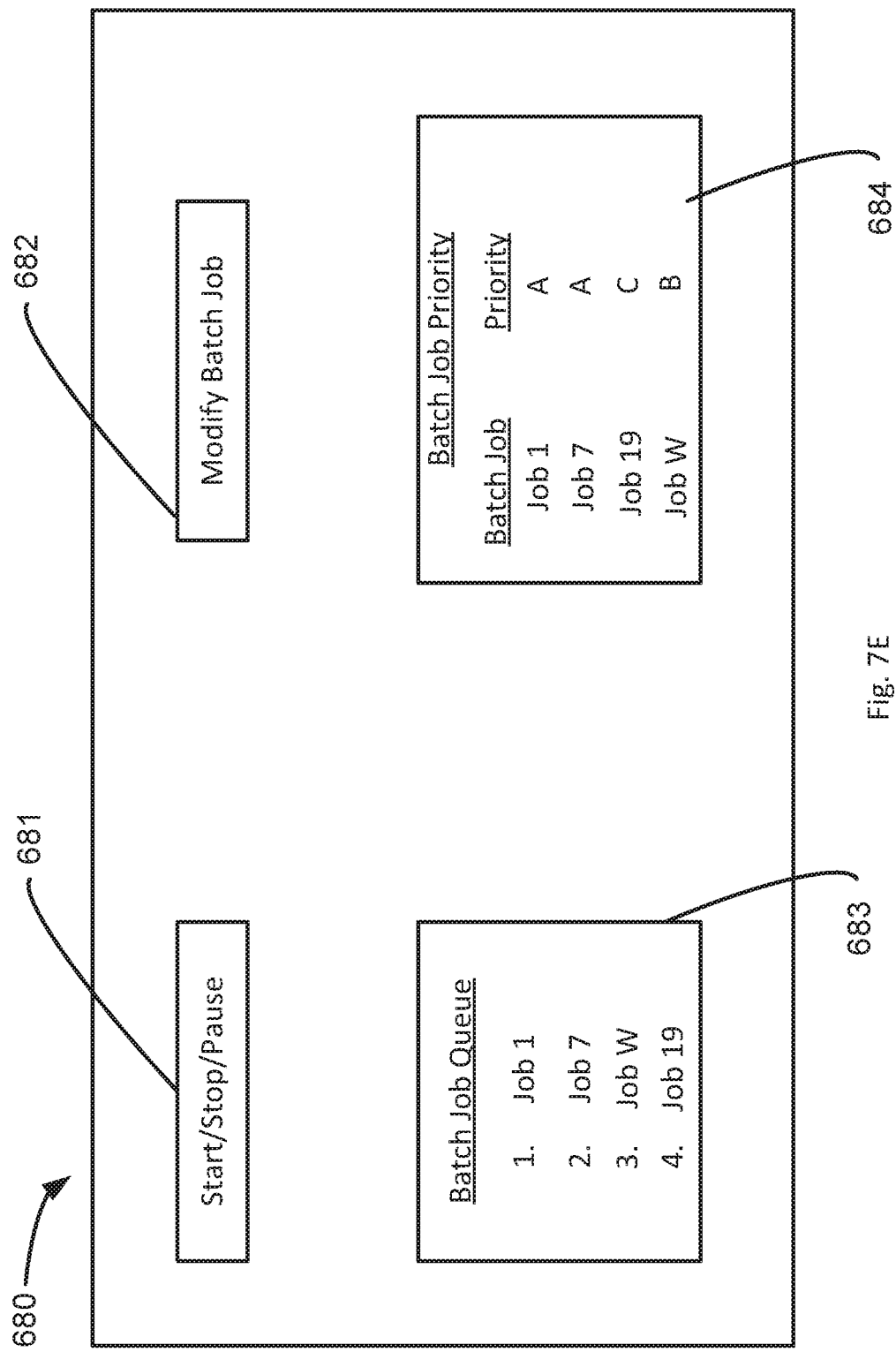
FIG. 7E illustrates an embodiment of a user interface that enables an operator to control a batch inspection system.

To those ends, FIG. 7E illustrates an embodiment of a user interface 680 that enables an operator to control a batch inspection system.

The user interface 680 includes a batch job queue area 683, which displays a queue of batch jobs. An operator may add a batch job by typing the name of that batch job into the queue. An operator 99 may change the order of batch jobs in the queue by selecting a batch job from the queue and dragging that batch job to a new location in the queue.

The user interface 680 includes a control input 681 configured to receive input from an operator 99 to start a selected batch job, to pause a selected batch job, and/or to stop a selected batch job. For example, the operator 99 may select a batch job by clicking on the name of that batch job in the Batch Job Queue area 683, and can control the execution of that selected batch job by clicking on "Start," "Stop," or "Pause" at control input 681.

The user interface 680 includes a button 682 configured to enable an operator 99 to modify a selected batch job. For example, the operator 99 may select a batch job by clicking on the name of that batch job in the Batch Job Queue area 683. Clicking on button 682 then causes the computer 50 to display the user input screen schematically illustrated in FIG. 5C, which then allows the operator to modify the selected batch job.

The user interface 680 includes a batch job queue area 684, which displays a list of available batch jobs, and a priority level for each batch job. For example, in this illustrative embodiment, Job 1 and Job 7 each have a priority level of "A" (highest priority), Job W has a priority level of "B" (second highest priority), and Job 19 has a priority level of "C" (lower than priority levels A and B). In some embodiments, the control computer 50 orders the jobs in the queue in area 683 according to the respective priority level of those jobs, unless the operator 99 changes the order of batch jobs, such as through the use of area 683.

REFERENCE NUMBERS

Reference numbers used herein include the following:
- 10: Workpiece batch-processing system;
- 13: Database;
- 20: Set of manufacturing stations;
- 30: Workpiece handling apparatus;
- 40: Workpiece inspection system;
- 50: Central computer;
- 51: Supervisor software;
- 52: Measurement software;
- 53: Network interface;
- 54: Display device;
- 99: Operator;
- 100: Coordinate measuring machine;
- 101: Floor;
- 102: Environment;
- 110: Base;
- 111: Table;
- 112: Plane;
- 113: Measurement envelope;
- 115: Probe rack;
- 120: Moveable features;
- 121: Bridge legs;
- 122: Table scale;
- 123: Bridge;
- 124: Bridge scale;
- 125: Carriage;
- 126: Spindle;
- 127: Spindle scale;
- 128: Bearing;
- 130: Arm;
- 131: Moveable joint;
- 132: Rotary encoder;
- 140: Measuring sensor;
- 141: Camera;
- 142: Environmental sensor;
- 150: Control system;
- 151: Bus;
- 152: Communications interface;
- 153: Motion Controller;
- 154: Measurement analyzer;
- 155: Sensor input;
- 156: Memory;
- 157: Computer processor;
- 160: User interface;
- 161: X-axis controls;
- 162: Y-axis controls;
- 163: Z-axis controls;
- 165: Camera motion controls;
- 166: Camera focus control;
- 167: Camera record control;
- 170: Host computer;
- 171: Screen;
- 172: Keyboard;
- 173: Mouse;
- 174: Computer memory;
- 175: Memory interface/communications port;
- 176: Communication link;
- 178: Network;
- 179: Computer;
- 180: Workpiece;
- 181: Geometry;
- 182: Edge;
- 183: Corner;
- 184: Flat surface;
- 185: Curved surface;
- 186: Cavity;
- 187: Inside angle;
- 188: Waviness;
- 189: Surface finish;
- 190: Jogbox;
- 191: Cable;
- 200: Workpiece storage apparatus;
- 201: Storage container;
- 202: Storage plate surface;
- 203: Storage plate;
- 221: First container;
- 222: Second container;
- 223: Third container;
- 300: Robot;
- 610: Top page;
- 620: Object definition page;
- 630: Drawer definition page;
- 631: Layout area;
- 639: Workpiece or pallet icon;
- 641: Drawer view;
- 642: Grid pattern;
- 643: Orientation key;
- 650: Job tracking template.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of operating a batch inspection system, the method comprising:
providing a set of workpieces to be inspected by the inspection system, the set of workpieces comprising:
a first workpiece requiring a first set of inspection operations by an inspection instrument of the inspection system; and
a second workpiece requiring a second set of inspection operations by the inspection instrument the inspection system, the second workpiece not identical to the first workpiece, and the second set of operations not identical to the first set of operations;
for the first workpiece, instantiating an instance of a first set of inspection operations (the first instance);
automatically providing the first workpiece to the inspection system and executing the first set of inspection operations on the first workpiece according to the first instance, and subsequently;
for the second workpiece, instantiating an instance a second set of inspection operations (the second instance); and
contemporaneously and automatically providing the second workpiece to the inspection system, without providing an intervening workpiece to the inspection system after the first workpiece, and executing the second set of inspection operations on the second workpiece according to the second instance.

2. The method of claim 1 further comprising:
providing a database storing a plurality of job objects, each job object of the plurality of job objects including the first set of inspection operations and a second set of inspection operations;
the method further comprising obtaining from the database a job object having first set of inspection operations tailored to the first object, and a second set of inspection operations tailored for the second object.

3. The method of claim 1, wherein the inspection instrument comprises a coordinate measuring machine, and wherein:
automatically providing the first workpiece to the inspection instrument comprises automatically providing the first workpiece to the coordinate measuring machine; and wherein:
executing the first set of operations on the first workpiece according to the first instance comprises operating the coordinate measuring machine according to the first instance to measure the first workpiece.

4. The method of claim 1, wherein the first set of inspection operations comprises a set of operations for measuring physical dimensions of the first workpiece.

5. The method of claim 1, wherein the first set of inspection operations comprises a set of operations for measuring surface roughness of the first workpiece.

6. The method of claim 1, wherein the inspection instrument comprises a coordinate measuring machine, and wherein:
the second set of inspection operations comprises automatically obtaining a different probe by the coordinate measuring machine.

7. A method of configuring a batch inspection system having an inspection apparatus, a buffering apparatus, and a controller, the controller having a display device, the method comprising:
displaying, on the display device, a graphical user interface, the graphical user interface comprising a layout manager having:
a graphical container, the graphical container representing a corresponding physical container and having a grid pattern of precise grid locations to precisely represent corresponding locations within the corresponding physical container; and
a layout area displaying a set of icons, each icon in the set of icons graphically representing one of (a) a workpiece to be inspected by the batch inspection system, or (b) a pallet holding a set of workpieces to be inspected by the batch inspection system;
defining a batch job data object, defining the batch job object comprising:
receiving, via the graphical user interface from an operator, placement input to select each icon of the set of icons from the layout area and place each such icon into a respective precise grid location of the graphical container, said respective precise grid location representing a physical location of its corresponding workpiece or fixture in the buffering apparatus;
providing the batch job data object to the inspection system for execution by the inspection system; and causing the inspection system to execute a batch job to inspect each workpiece of a plurality of workpieces according to the batch job data object.

8. The method of claim 7, further comprising:
displaying, on the display device, a part program input field to receive from the operator, and store in the batch job data object, specification of a set of part programs, each part program in the set of part programs corresponding to a respective workpiece from the plurality of workpieces; and
receiving, via the part program input field, specification of a set of part programs, and storing said specification in the batch job data object.

9. The method of claim 8, wherein:
each workpiece of the plurality of workpieces is a distinct species of workpiece from each other workpiece in the plurality of workpieces; and
each part program in the set of part programs is distinct from each other each part program in the set of part programs, such that the inspection system performs a distinct set of inspection operations corresponding, respectively, to the species of each workpiece of the plurality of workpieces.

10. The method of claim 7, further comprising:
displaying, on the display device, a set of data input fields, each data input field in the set of data input fields configured to receive specification of a respective job datum, the set of data input fields comprising one or more of:
an operator name;
a set of part serial numbers, each part serial number in the set of part serial numbers corresponding, respectively, to a respective workpiece of the plurality of workpieces;
a set of part weights, each part weight in the set of part weights corresponding, respectively, to a respective workpiece of the plurality of workpieces;
a set of gripper widths, each gripper width in the set of gripper widths corresponding, respectively, to a respective workpiece of the plurality of workpieces; and
a specification of a part container, the specification comprising at least one of a grid size or a number of cells, and a reference system for the container.

11. A batch inspection system for executing a batch job to inspect a batch having a plurality of workpieces, the system comprising:
a coordinate measuring machine having a measuring space;
a storage apparatus for storing a batch of workpieces to be inspected by the coordinate measuring machine;
a robot configured to sequentially retrieve, from the storage apparatus, each workpiece of the batch of workpieces, and configured to deliver each such workpiece to the measuring space of the coordinate measuring machine; and
a control computer having a display, the control computer in control communication with the coordinate measuring machine and the robot, the control computer configured the execute instructions which, when executed, cause display on the display device of a user interface, the user interface including a graphical user interface comprising:
a graphical container, the graphical container representing a corresponding physical container and having graphical locations to precisely represent corresponding physical locations within the corresponding physical container; and
a layout area displaying a set of icons, each icon in the set of icons graphically representing one of (a) a workpiece to be inspected by the batch inspection system, or (b) a pallet holding a set of workpieces to be inspected by the batch inspection system;
wherein the control computer is further configured to receive, via the graphical user interface, and store in a batch job data object, operator input defining the batch job data object to configure the coordinate measuring machine and the robot to inspect each of the plurality of workpieces in the batch.

12. The system of claim 11, wherein the control computer is further configured to provide the batch job data object to the coordinate measuring machine and the robot for execution of the batch job, according to the batch job data object, by the coordinate measuring machine and the robot.

13. The system of claim 11, wherein the control computer is further configured to receive, from the operator, control input to control execution of the batch job.

14. The system of claim 11, wherein the graphical user interface is configured to receive input from the operator to select an icon from the layout area and place that icon into the graphical container to precisely indicate the location, in a storage apparatus, of a workpiece corresponding to the icon.

15. The system of claim 11, wherein the graphical user interface is configured to receive input from the operator to select each icon of a plurality of icons from the layout area and place each such icon into the graphical container to precisely indicate the location, in a storage apparatus, of a corresponding workpiece.

16. The system of claim 11, wherein the container includes predetermined orientation points, and the graphical user interface is configured to receive input from the operator to orient the graphical container to the container using the orientation points.

17. The system of claim 11, wherein the container includes predetermined orientation points, and the graphical container includes a set of reference points, each reference point in the set of reference points corresponding to a one of the orientation points on the container, and wherein the graphical user interface is configured to receive input from the operator and the robot to orient the graphical container to the container.

18. The system of claim 11, wherein the user interface further includes a part program input field to receive from the operator, and store in the batch job data object, specification of a set of part programs, each part program in the set of part programs corresponding to a respective workpiece from the plurality of workpieces.

19. The system of claim 11, wherein the user interface further includes a set of data input fields, each data input field in the set of data input fields configured to receive specification of a respective job datum, the set of data input fields comprising one or more of:
an operator name;
a set of part serial numbers, each part serial number in the set of part serial numbers corresponding, respectively, to a respective workpiece of the plurality of workpieces; and
a specification of a part container, the specification comprising at least one of a grid size or a number of cells, and a reference system for the container.

20. The system of claim 11, wherein the user interface further includes a set of data input fields, each data input field in the set of data input fields configured to receive specification of a respective job datum, the set of data input fields comprising one or more of:
- a set of part weights, each part weight in the set of part weights corresponding, respectively, to a respective workpiece of the plurality of workpieces; and
- a set of gripper widths, each gripper width in the set of gripper widths corresponding, respectively, to a respective workpiece of the plurality of workpieces.

* * * * *